(12) United States Patent
Pellini et al.

(10) Patent No.: US 11,459,988 B2
(45) Date of Patent: Oct. 4, 2022

(54) HIGH PRESSURE FUEL PUMP WITH MECHANICAL PRESSURE REGULATION

(71) Applicant: Stanadyne LLC, Windsor, CT (US)

(72) Inventors: Richard P. Pellini, South Windsor, CT (US); Kenneth R. Morel, Bloomfield, CT (US); David G. Palermo, West Springfield, MA (US); Dominic M. Myren, Chicopee, MA (US); Yevgeniy Norkin, Longmeadow, MA (US); Michael Wegrzyniak, East Granby, CT (US)

(73) Assignee: Stanadyne LLC, Windsor, CT (US)

( * ) Notice: Subject to any disclaimer, the term of this patent is extended or adjusted under 35 U.S.C. 154(b) by 0 days.

(21) Appl. No.: 17/295,682

(22) PCT Filed: Nov. 27, 2019

(86) PCT No.: PCT/US2019/063504
§ 371 (c)(1),
(2) Date: May 20, 2021

(87) PCT Pub. No.: WO2020/112933
PCT Pub. Date: Jun. 4, 2020

(65) Prior Publication Data
US 2022/0018322 A1 Jan. 20, 2022

Related U.S. Application Data

(60) Provisional application No. 62/771,829, filed on Nov. 27, 2018.

(51) Int. Cl.
*F02M 59/34* (2006.01)
*F02D 41/38* (2006.01)
(Continued)

(52) U.S. Cl.
CPC ............. *F02M 59/34* (2013.01); *F02D 7/007* (2013.01); *F02D 41/3845* (2013.01);
(Continued)

(58) Field of Classification Search
CPC ...... F02M 59/34; F02M 59/36; F02M 59/464; F02M 61/205; F02M 63/0028;
(Continued)

(56) References Cited

U.S. PATENT DOCUMENTS 9,243,596 B2    1/2016  Hornby et al.
2011/0000463 A1* 1/2011  Kokotovic ......... F02M 37/0029
                                                      123/457

(Continued)

FOREIGN PATENT DOCUMENTS

DE           10327411 A1    4/2004
DE      102011007182 A1    10/2012
(Continued)

OTHER PUBLICATIONS

PCT International Search Report and Written Opinion for International application No. PCT/US2019/063504 filed Nov. 27, 2019; dated Feb. 26, 2020; 10 pgs.
(Continued)

*Primary Examiner* — Mahmoud Gimie
(74) *Attorney, Agent, or Firm* — Alix, Yale & Ristas, LLP

(57) ABSTRACT

A high pressure fuel pump includes an inlet metering valve arranged to control a quantity of fuel delivered to the pumping chamber during retracting motion of the pumping plunger. The inlet metering valve includes a metering valve member movable between a closed position and an open position, movement of the metering valve member from the closed position to the open position defining a variable flow area that increases as the metering valve member moves (Continued)

from the closed position toward the open position. An actuator piston in an actuator bore is exposed to pressure in the common rail. The actuator piston is biased toward a first position corresponding to low pressure in the common rail and movable toward a second position corresponding to maximum pressure in the common rail. The actuator piston includes a valve stop that determines a metering position of the metering valve member.

13 Claims, 17 Drawing Sheets

(51) Int. Cl.
- *F02M 59/36* (2006.01)
- *F02M 59/46* (2006.01)
- *F02M 63/02* (2006.01)
- *F02D 7/00* (2006.01)
- *F02M 61/20* (2006.01)
- *F02M 63/00* (2006.01)

(52) U.S. Cl.
CPC .......... *F02M 59/36* (2013.01); *F02M 59/464* (2013.01); *F02M 61/205* (2013.01); *F02M 63/0028* (2013.01); *F02M 63/0075* (2013.01); *F02M 63/023* (2013.01); *F02D 2200/0602* (2013.01)

(58) Field of Classification Search
CPC .. F02M 63/0075; F02M 63/023; F02D 7/007; F02D 41/3845; F02D 2200/0602
USPC ........................................................ 123/446
See application file for complete search history.

(56) References Cited

U.S. PATENT DOCUMENTS

| 2011/0209687 A1* | 9/2011 | Schroeder .......... F02M 63/0265 |
| | | 123/459 |
| 2015/0252768 A1* | 9/2015 | Lucas ................... F02M 59/46 |
| | | 123/456 |

FOREIGN PATENT DOCUMENTS

| EP | 2434137 A1 | 3/2012 |
| JP | 2010163888 A | 7/2010 |

OTHER PUBLICATIONS

PCT International Preliminary Report on Patentability and Written Opinion for International application No. PCT/2019/063504 filed Nov. 27, 2019; dated Jun. 10, 2021; Date of Issuance: May 25, 2021; 8 pgs.

\* cited by examiner

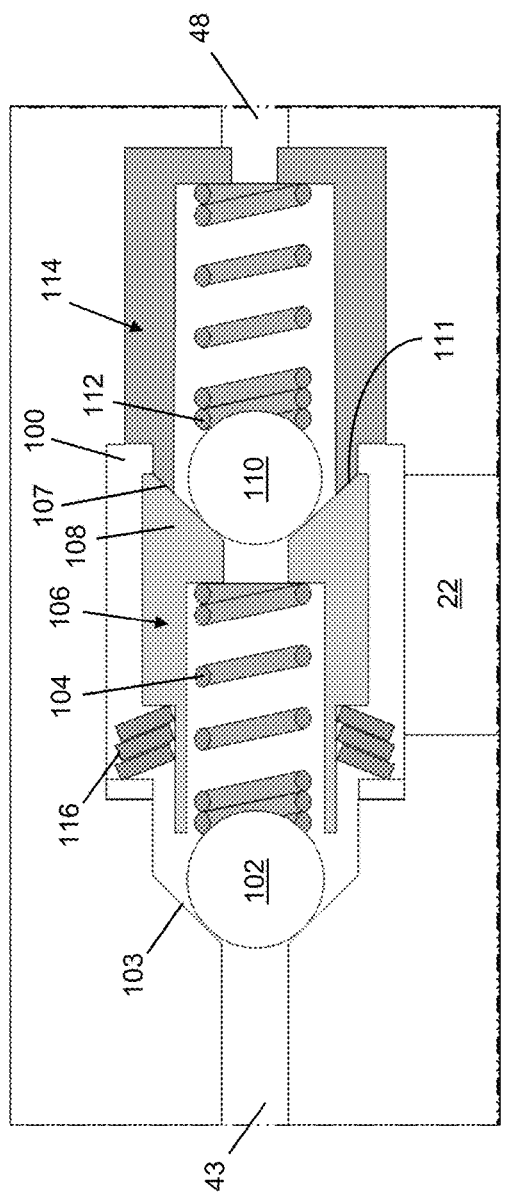
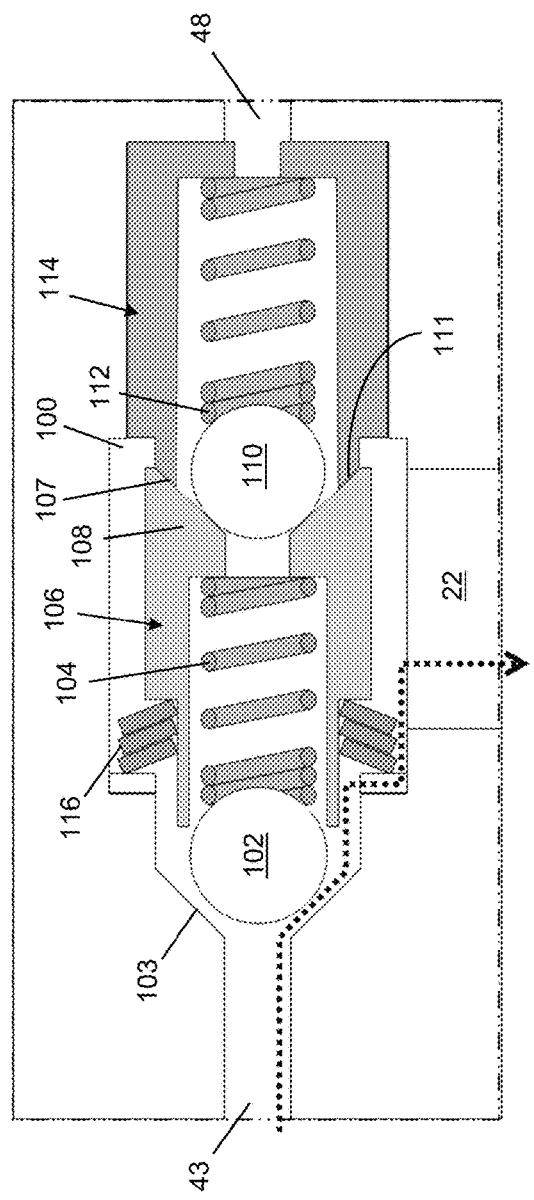
Figure 15
Figure 16

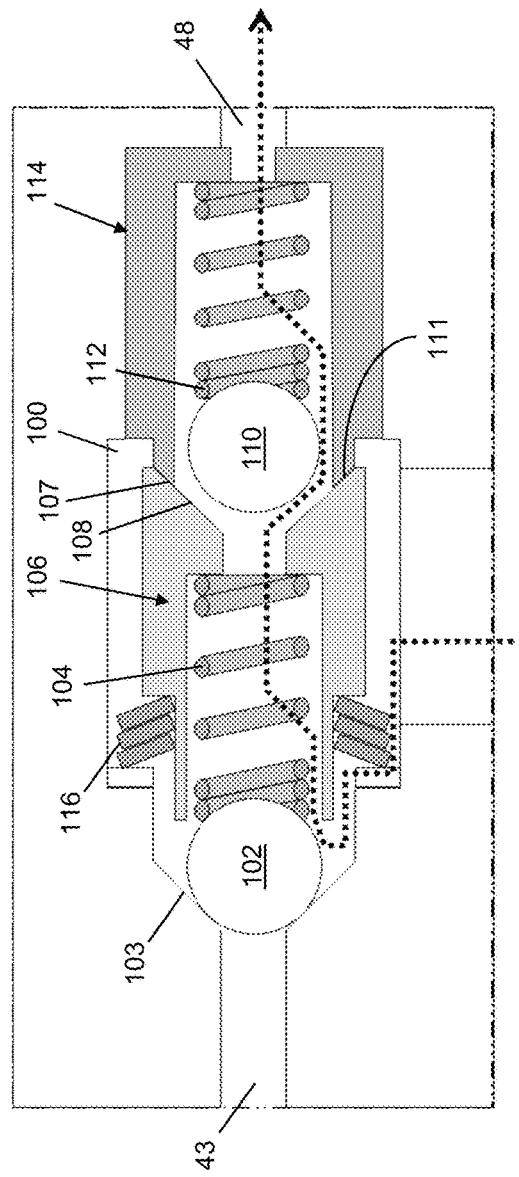
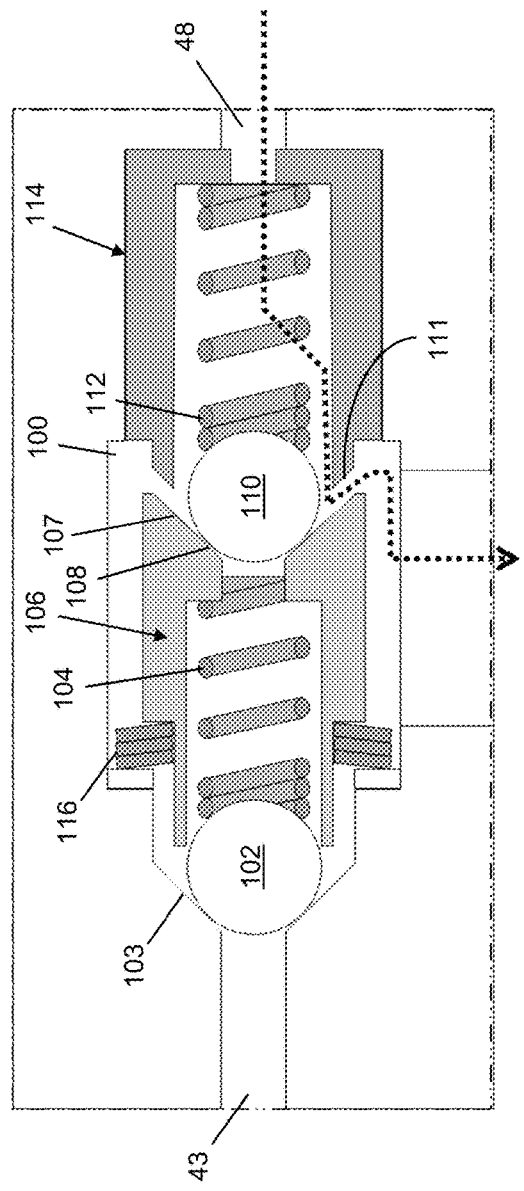
Figure 17
Figure 18

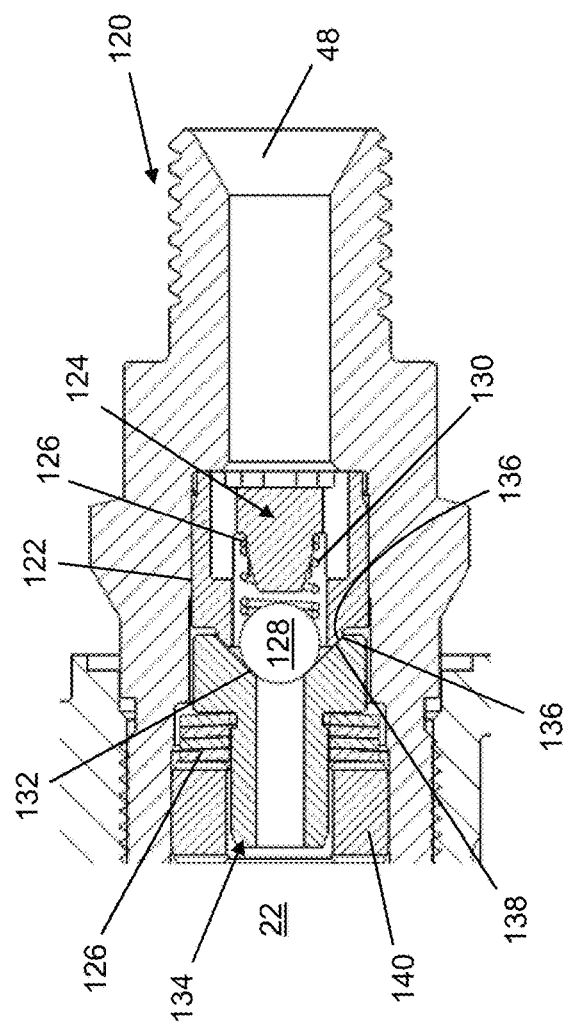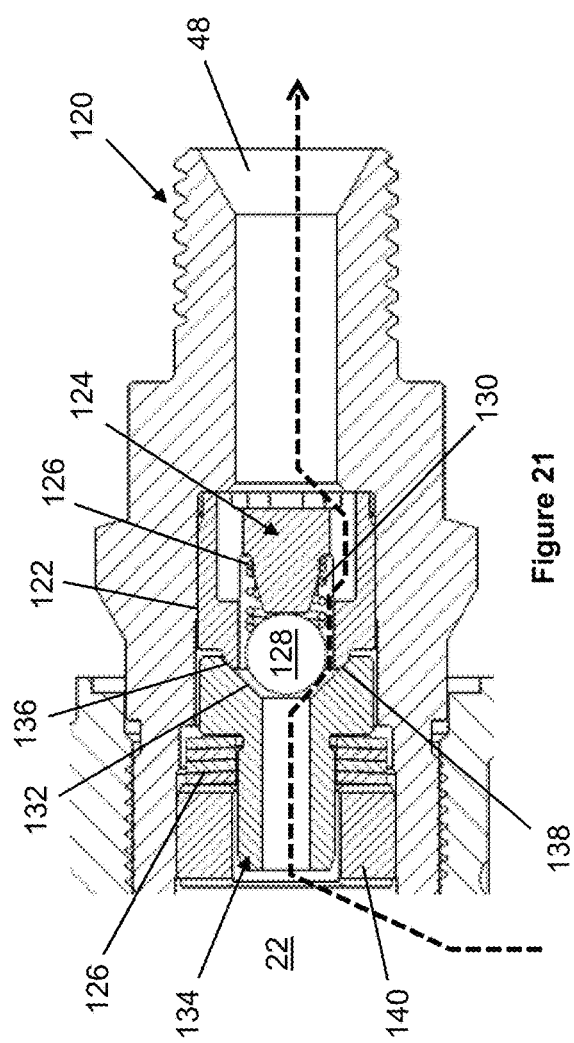

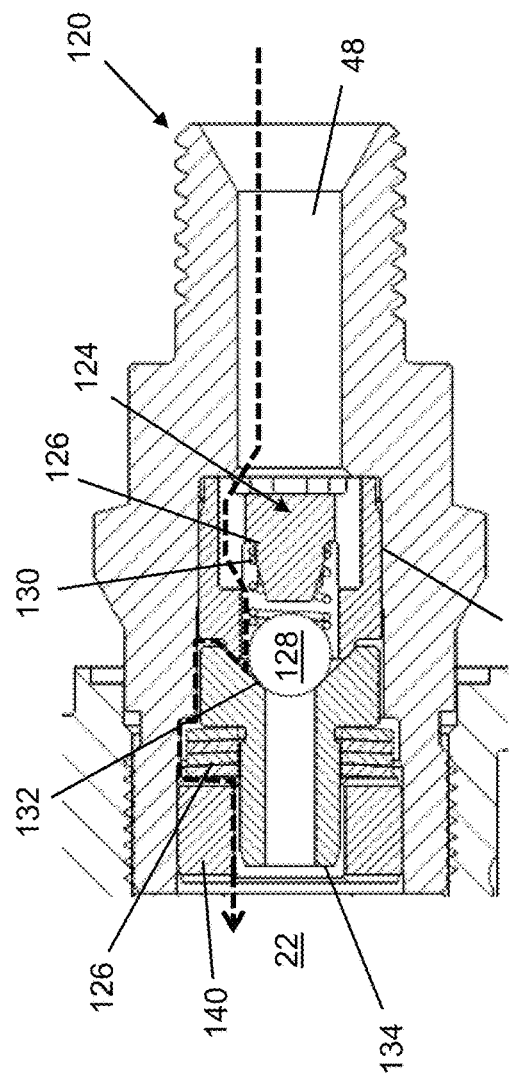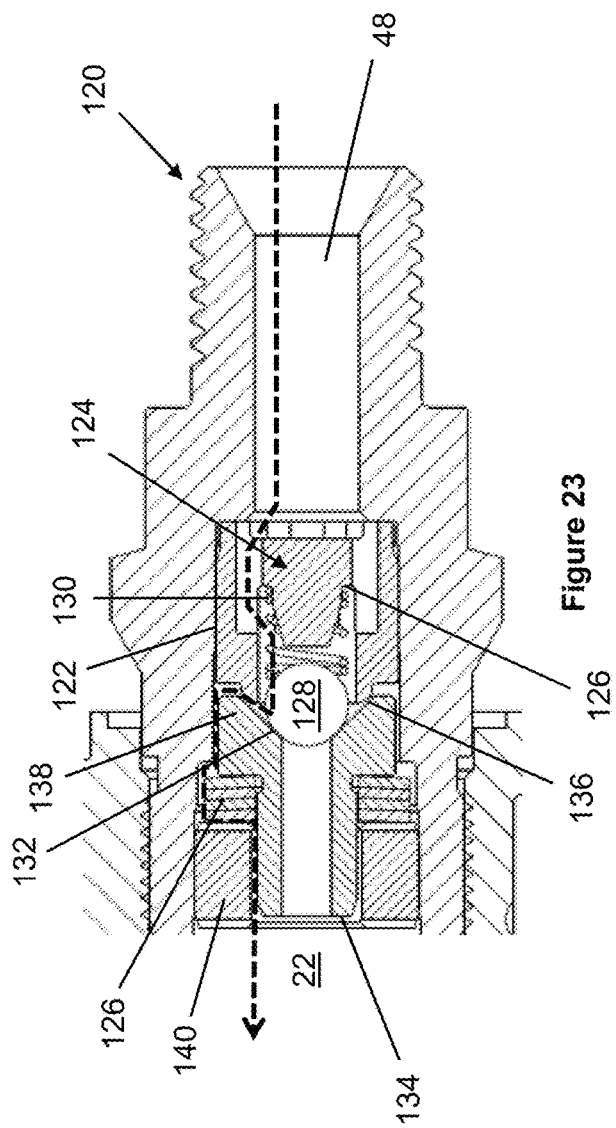

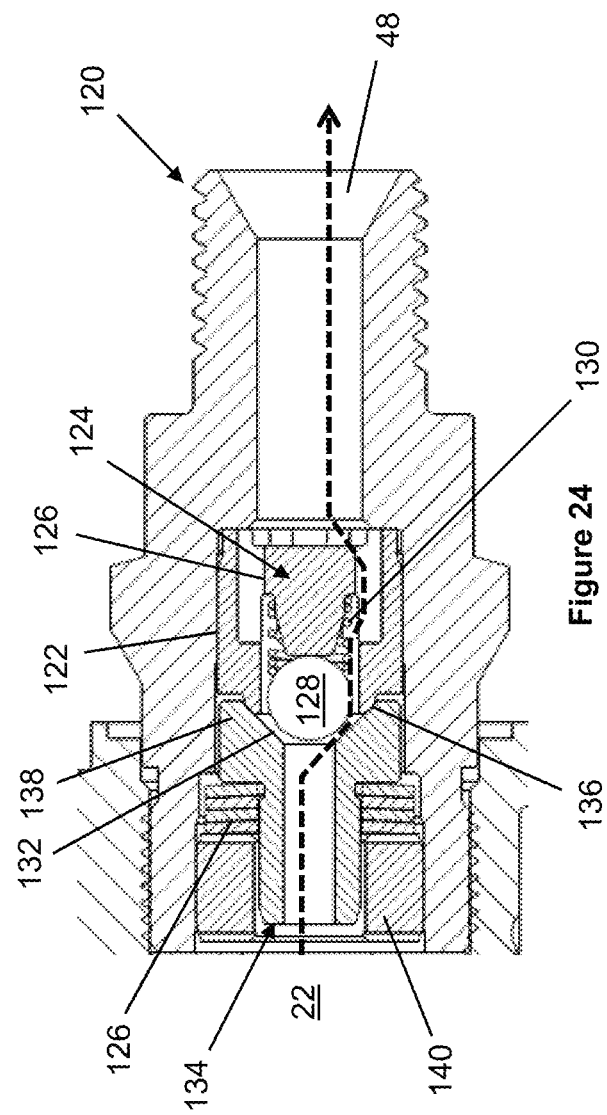

HIGH PRESSURE FUEL PUMP WITH MECHANICAL PRESSURE REGULATION

BACKGROUND

The present disclosure relates to a direct injection high pressure pumps for automobiles and, more particularly, to a pressure operated, mechanical flow control valve for the pump inlet.

In today's automotive engine systems, there is an increased demand for low cost, direct injection. In common rail injection systems, the fuel is delivered by means of a high pressure pump to a fuel rail which serves as a pressurized storage reservoir for the fuel. The fuel is under high pressure in the fuel rail and can be injected directly into the cylinders via injectors connected to the rail. Ideally, the fuel injection system is designed to maintain a constant, or nearly constant pressure in the common rail.

Typical high pressure fuel pumps have a solenoid valve at the inlet as a flow control valve to control flow rate through the pump. The solenoid valve is complicated, requires an electrical connection to a power source, as well as a complex control system, and adds cost to the high pressure pump. The solenoid valve may be configured and operated to "spill" fuel back to a low pressure inlet of the pump during an initial part of the pumping stroke of the high pressure pump plunger. This so-called "fill-and-spill" method fills the pumping chamber of the fuel pump completely, and then spills some of the fuel back to the low pressure inlet to control the quantity of fuel delivered to the common rail.

An alternative inlet valve configuration controls the rate of fuel flow into the pumping chamber of the fuel pump. A proportional solenoid may be used to control the area of a variable flow opening to vary the rate that fuel flows into the pumping chamber. The fuel pump pressurizes and pumps only the fuel that is permitted to enter the pumping chamber.

In either the fill-and-spill or inlet metering configuration, the pressure of the common rail is monitored by an engine control unit (ECU) and the solenoid actuated inlet valve is operated to increase or decrease the quantity of fuel pumped by the fuel pump to maintain a constant pressure in the common rail.

There is a need for a pressure operated, mechanical flow control valve that is simple in construction, eliminates electronic control and delivers fuel under a consistent pressure to a fuel rail.

SUMMARY

A high pressure fuel pump with mechanical pressure regulation includes a pumping plunger is driven by a cam follower in contact with a profile of a rotating cam, the pumping plunger reciprocating axially in a pumping chamber between a retracting motion during which fuel is delivered to the pumping chamber and a pumping motion during which the plunger pressurizes fuel in the pumping chamber. Fuel pressurized by the pump flows through a pump outlet passage to a pressurized common rail. The fuel pump includes an inlet metering valve arranged to control a quantity of fuel delivered to the pumping chamber during retracting motion of the pumping plunger. The inlet metering valve includes a metering valve member movable between a closed position preventing fuel flow into the pumping chamber and an open position allowing fuel to fill the pumping chamber, movement of the metering valve member from the closed position to the open position defining a variable flow area that increases as the metering valve member moves from the closed position toward the open position. The pump also includes an actuator piston in an actuator bore exposed to pressure in said common rail, the actuator piston biased toward a first position corresponding to low pressure in the common rail and movable toward a second position corresponding to maximum pressure in the common rail. The actuator piston includes a valve stop that determines a metering position of the metering valve member. The metering valve member opens (moves away from the closed position) during retracting motion of the pumping plunger to a metering position in contact with the valve stop. The metering position of the metering valve member defining a variable flow area which is a function of the pressure in the common rail communicated to the actuator bore.

The metering valve member may be biased toward the closed position by an inlet metering check valve spring compressed between the metering valve member and the actuator piston. In alternative embodiments, the inlet metering check valve spring is compressed between the metering valve member and a structure other than the actuator piston. The inlet metering check valve spring may be selected to have a light bias so that the inlet metering valve member opens when fuel pressure in the pump inlet is greater than fuel pressure in the metering passage, allowing the metering valve member to function as a pump inlet check valve. The actuator piston may be biased toward a first position corresponding to low pressure in the actuator passage by an actuator spring compressed between an interior of the actuator bore and the actuator piston. In some embodiments the actuator spring surrounds and is concentric with the inlet metering check valve spring. The actuator spring is selected so that said actuator piston moves to the second position when fuel pressure in the common rail is equal to or greater than the maximum pressure and a force balance between fuel pressure in the common rail and the bias of the actuator spring determines a position of said actuator piston between the first and second positions. The position of the actuator piston in the actuator bore defines the metering position of the metering valve member, with the metering position being a function of fuel pressure in the common rail communicated to the actuator bore and applied to an end of the actuator piston in opposition to a bias force applied to the actuator piston by the actuator spring. The metering valve member controls fuel flow between a pump inlet and a metering passage leading into the pumping chamber.

According to aspects of the disclosure, the actuator spring may be selected to generate an actuator piston bias force, and the inlet metering check valve spring may be selected to generate an inlet metering check valve bias force, with the actuator spring bias force being greater than the inlet metering check valve bias force. The actuator spring bias force may be at least twice the inlet metering check valve bias force, or more preferably at least five times the inlet metering check valve bias force, or most preferably at least ten times the inlet metering check valve bias force. In a high pressure fuel pump where the metering valve member is biased by an inlet metering check valve spring compressed between the actuator piston and the metering valve member, a large force difference between the bias force of the inlet metering check valve spring and the actuator spring serves two purposes. First, a light inlet metering check valve spring allows the metering valve member to function as a pump inlet check valve, opening when exposed to relatively low fuel pressure generated by a low pressure fuel supply pump during retraction of the pumping plunger. Second, a large force difference between these two springs ensures that movement of the actuator piston is a function of pressure in the pump outlet passage and common rail and is substantially unaffected by the bias force of the inlet metering check valve spring.

The high pressure fuel pump includes a pump body that defines the pumping chamber, the pump outlet passage and the actuator passage connecting the pump outlet passage to the actuator bore. In some embodiments of the disclosed high pressure fuel pump, the actuator piston includes an actuator valve, and the actuator bore includes an actuator valve seat. The actuator valve seats against the actuator valve seat when the actuator piston is in the first position to prevent fuel flow from the common rail past the actuator piston.

The disclosure also includes a method of controlling the quantity of fuel delivered to a pumping chamber of a high pressure fuel pump in which a pumping plunger is driven by a cam follower in contact with a profile of a rotating cam, the pumping plunger reciprocating axially in the pumping chamber between a retracting motion during which fuel is delivered to the pumping chamber and a pumping motion during which the plunger pressurizes fuel in the pumping chamber. Fuel pressurized in the pumping chamber flowing through a pump outlet passage to a pressurized common rail. The method includes arranging an inlet metering valve to control a quantity of fuel delivered to the pumping chamber during retracting motion of the pumping plunger. The inlet metering valve defines a variable flow area between a pump inlet and a metering passage connected to the pumping chamber by moving between a closed position preventing fuel flow into the pumping chamber and an open position allowing fuel to fill the pumping chamber. Movement of the metering valve member from the closed position to the open position defining the variable flow area, which increases as the metering valve member moves from the closed position toward the open position.

The disclosed method includes controlling a metering position of the metering valve by contact with a valve stop carried by an actuator piston arranged in an actuator bore exposed to pressure in the common rail. The actuator piston is biased toward a first position corresponding to low pressure in the common rail and movable toward a second position corresponding to maximum pressure in the common rail. The metering valve member opens to a metering position in contact with the valve stop during retracting motion of the pumping plunger, the variable flow area being a function of the pressure in the common rail communicated to the actuator bore.

Fuel pressure in the pump outlet passage corresponds to fuel pressure in the common rail, and is isolated from the pumping chamber by a pump outlet check valve that closes when fuel pressure in the pumping chamber is less than fuel pressure in the pump outlet passage. Fuel pressure in the pump outlet passage applied to one end of the actuator piston opposes the bias applied to the actuator piston to move said actuator piston away from the first position to a position that is a function of pressure in said pump outlet passage during retracting motion of the pumping plunger. The actuator bore may include an actuator valve seat, and the actuator piston may include an actuator valve complementary to the actuator valve seat. The actuator valve seats against the actuator valve seat to prevent fuel flow past the actuator piston when the actuator piston is in said first position due to fuel pressure in the actuator passage falling below a pre-determined minimum fuel pressure.

BRIEF DESCRIPTION OF THE DRAWINGS

FIGS. 15-19 illustrate an integrated pump inlet check valve, pump outlet check valve and pressure relief valve according to aspects of the disclosure; and FIGS. 20-24 illustrate a pump outlet fitting with an integrated pump outlet check valve and pressure relief valve according to aspects of the disclosure.

DETAILED DESCRIPTION

Figure 1:
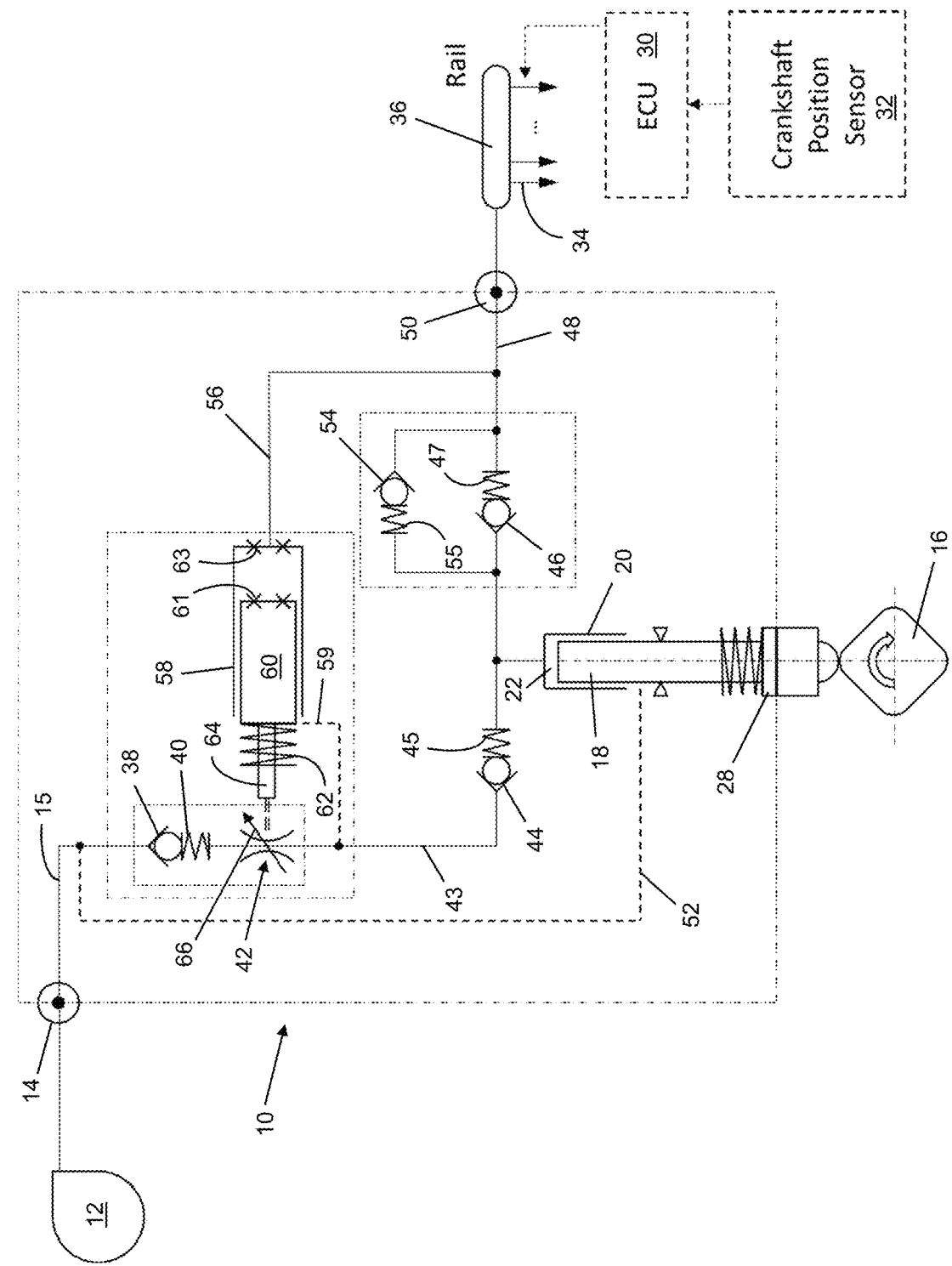
FIGS. 1-9 are schematic illustrations of a fuel injection system incorporating a high pressure pump according to aspects of the disclosure.
Figure 3:
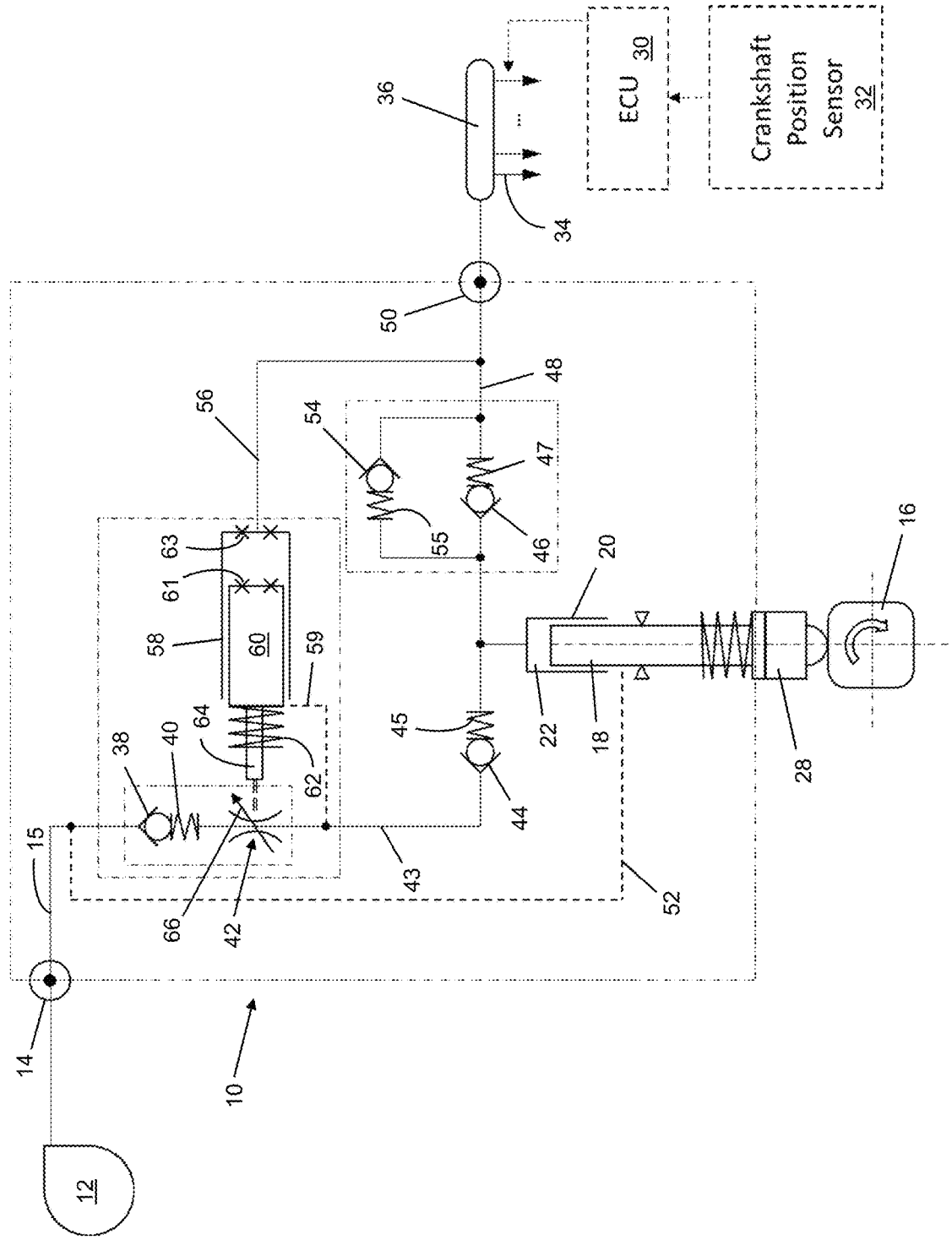

FIG. 1 is a schematic representation of a fuel injection system incorporating a high pressure pump (HPP) 10 which receives fuel from a low pressure pump (LPP) 12 at a pump inlet fitting 14 connected to a pump inlet passage 15. The HPP 10 is illustrated in the form of a single plunger pump driven by a cam 16. The HPP pumping plunger 18 reciprocates in a pump bore 20 to alternately expand the pumping chamber 22 to draw fuel into the pumping chamber and then pressurize the pumping chamber 20 to pump fuel to the common rail 36 via an outlet passage 48. A cam follower 28 is biased toward the profile of the cam 16 and is connected to the pumping plunger 18 to translate the shape of the cam profile into reciprocal movement of the pumping plunger 18. The cam 16 has a four-sided profile that will generate four charge/pump cycles of the pumping plunger 18 for each 360° rotation of the cam 16. The cam may have any number of lobes, with most having three or four lobes. The durations of the charging and pumping cycles are a function of the cam profile and rotational speed of the cam 16. The cam 16 in FIG. 1 is shown at a "top dead center" (TDC) of the cam profile, which defines the end of a pumping cycle and the beginning of a charging cycle. FIG. 3 illustrates the cam 16 at a "bottom dead center" (BDC) of the cam profile, which defines the end of a charging cycle and the beginning of a pumping cycle. The total stroke of the pumping plunger 18 is defined by the radial distance from the cam's TDC and BDC positions. Each lobe of the cam profile may be asymmetric such that the angular displacement from BDC to TDC may be different from TDC to BDC. The profile of all lobes of the cam 16 is typically the same, but this is not required.

In the fuel injection system of FIG. 1, engine control unit (ECU) 30 uses information from a crankshaft position sensor 32 and other inputs to operate fuel injectors 34 connected to the common rail 36. The ECU 30 operates the fuel injectors 34 so that fuel is injected into each combustion chamber at the time and in the quantity demanded by the engine (not shown) according to the engine's operational condition, i.e., accelerating under load, idling, descending a long grade, etc. The ECU 30 and injectors 34 are configured for substantially constant pressure in the common rail 36, which is maintained by the HPP 10.

Figure 2:
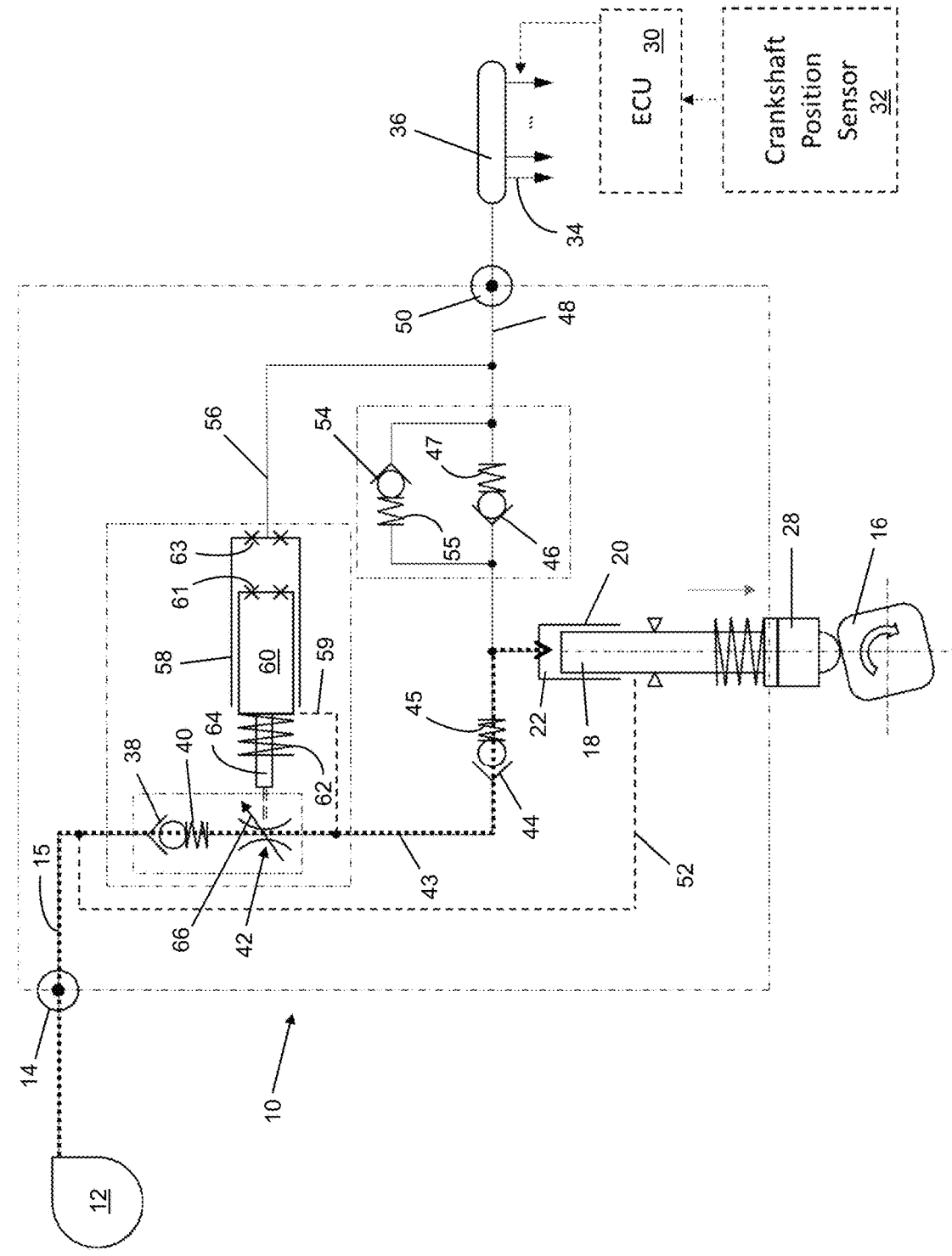

FIG. 2 illustrates a charging cycle of the HPP 10 with the pumping plunger 18 retracting from the pumping chamber 22 as the cam follower 28 moves along the profile of the cam 16. Feed pressure from the LPP 12 opens inlet metering check valve 38 against the bias of the inlet metering check valve spring 40 and fuel flows through the inlet metering valve 42. A metering passage 43 connects the inlet metering valve 42 with the pump inlet check valve 44. The pump inlet check valve 44 is opened by feed pressure from the LPP 12 passing through the inlet metering valve 42, allowing fuel to enter the pumping chamber 22 as long as the pressure in the pumping chamber 22 remains below the inlet feed pressure. The pump outlet check valve 46 is closed during the charging cycle because pressure upstream of the pump outlet check valve 46 is always greater than the pressure in the pumping chamber 22 when the pumping plunger 18 is retracting.

FIG. 3 illustrates the end of a charging cycle, where the pumping plunger 18 has reached the bottom of its stroke (BDC) and the pumping chamber 22 is fully expanded. Fuel flow into the pumping chamber 22 has stopped, and the inlet metering check valve 38 closes under the force of the inlet metering check valve spring 40. The pump inlet check valve 44 closes under the force of the pump inlet check valve spring 45, ending fuel flow into the pumping chamber 22.

Figure 4:
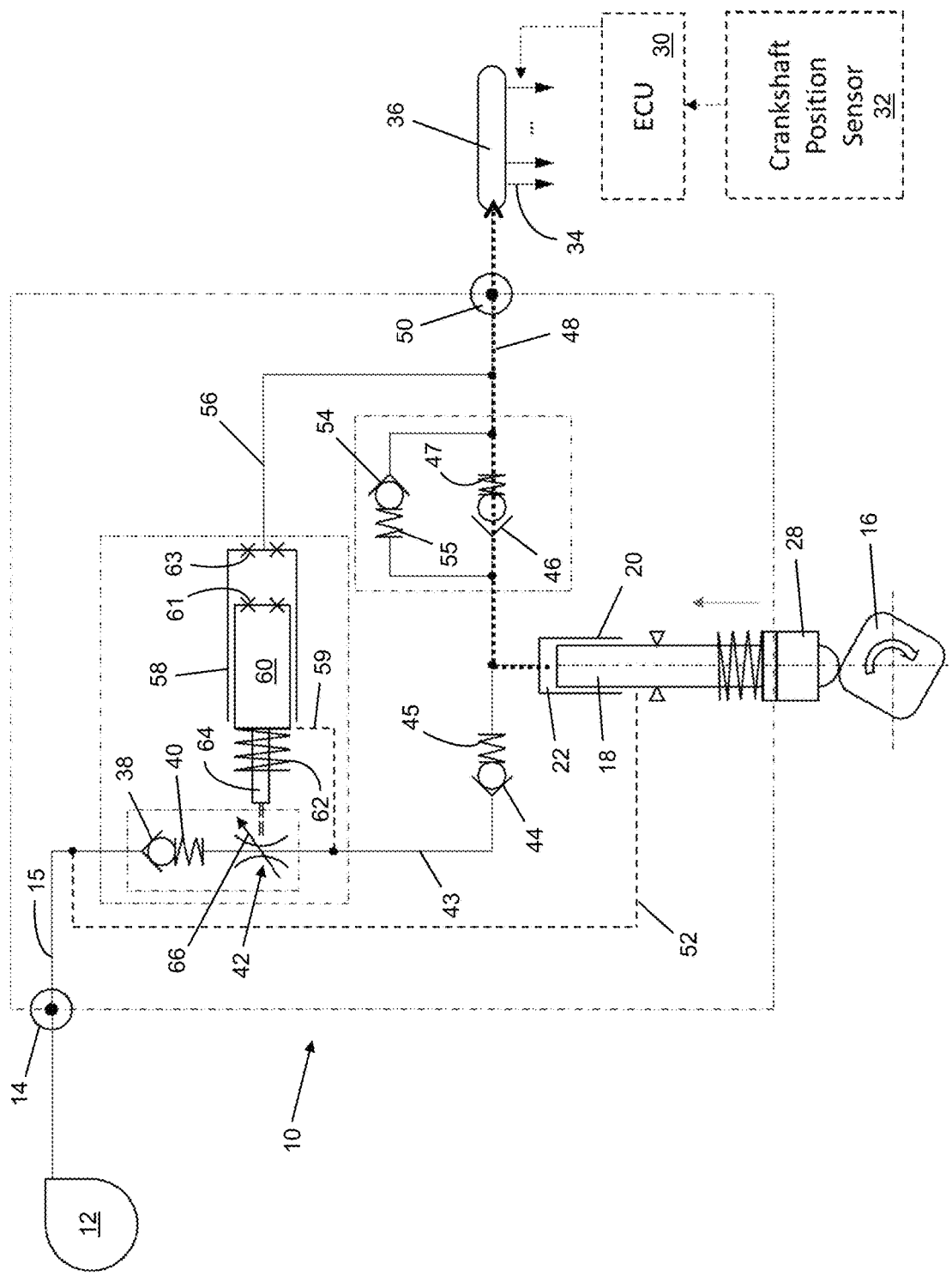

FIG. 4 illustrates a pumping cycle where the pumping plunger 18 is advanced into the pumping chamber 22 by the cam 16 acting on the cam follower 28 and pumping plunger 18. Fuel in the pumping chamber 22 is compressed by the advancing plunger 18 until the pressure in the pumping chamber 22 exceeds the pressure in the pump outlet passage 48 communicating with the pump outlet fitting 50 and common rail 36. When the pressure in the pumping chamber 22 exceeds the pressure in the pump outlet passage 48, the pump outlet check valve 46 opens and allows pressurized fuel to flow through the pump outlet passage 48 and pump outlet fitting 50 to the common rail 36. During normal operation, the pump outlet check valve 46 is held closed by fuel pressure in the high pressure passage 48, so the opening pressure of the outlet check valve 46 is determined by the pressure of fuel upstream (behind) the outlet check valve 46 rather than the bias of the pump outlet check valve spring 47. The illustrated HPP 10 defines a pump drain 52 back to the pump inlet passage 15 for fuel that leaks between the pumping plunger 18 and the pump bore 20.

The pumping cycle ends when the cam 16 reaches one of the four "top dead center" (TDC) points on the profile of the cam 16 as shown in FIG. 1. The maximum amount of fuel that can be transferred by the HPP 10 is a function of the pressure at the end of the pumping cycle, the bulk modulus of the fuel (under that pressure and temperature), the trapped volume of the pump, and leakage losses in the pump. The trapped volume of the HPP 10 is the volume bounded by the pumping plunger 18 at TDC, the closed pump inlet check valve 44, the closed pump outlet check valve 46 and pressure relief valve 54. The trapped volume of a pump plays a significant role in the overall volumetric efficiency of the pump, especially when the volume displaced by the pumping plunger is small compared to the trapped volume. Keeping the trapped volume as small as possible improves the volumetric efficiency of the disclosed HPP 10.

In the disclosed HPP 10, an inlet metering valve 42 is arranged to meter the quantity of fuel delivered to the pumping chamber 22 during each charging cycle. According to aspects of the disclosure, the inlet metering valve 42 is responsive to the pressure in the common rail 36 and does not require electronic control or connection to the ECU 30. An actuator passage 56 is connected to the high pressure outlet passage 48 of the HPP 10, which fluidly communicates with the pump outlet fitting 50 and common rail 36. The actuator passage 56 communicates the pressure of the common rail 36 to an actuator bore 58 of the inlet metering valve 42. An actuator piston 60 reciprocates in the actuator bore 58 in response to the pressure of the common rail 36 balanced against the force of an actuator spring 62. The actuator piston 60 is connected to a valve stop 64 that limits movement of an inlet metering valve member 66. As will be discussed in greater detail below, fuel flow through the inlet metering valve 42 varies according to the position of the inlet metering valve member 66, which is defined by the position of the valve stop 64. The disclosed HPP 10 defines an actuator leak path 59 in fluid communication with the metering passage 43, for fuel that leaks between the actuator piston 60 and the actuator bore 58.

Figure 5:
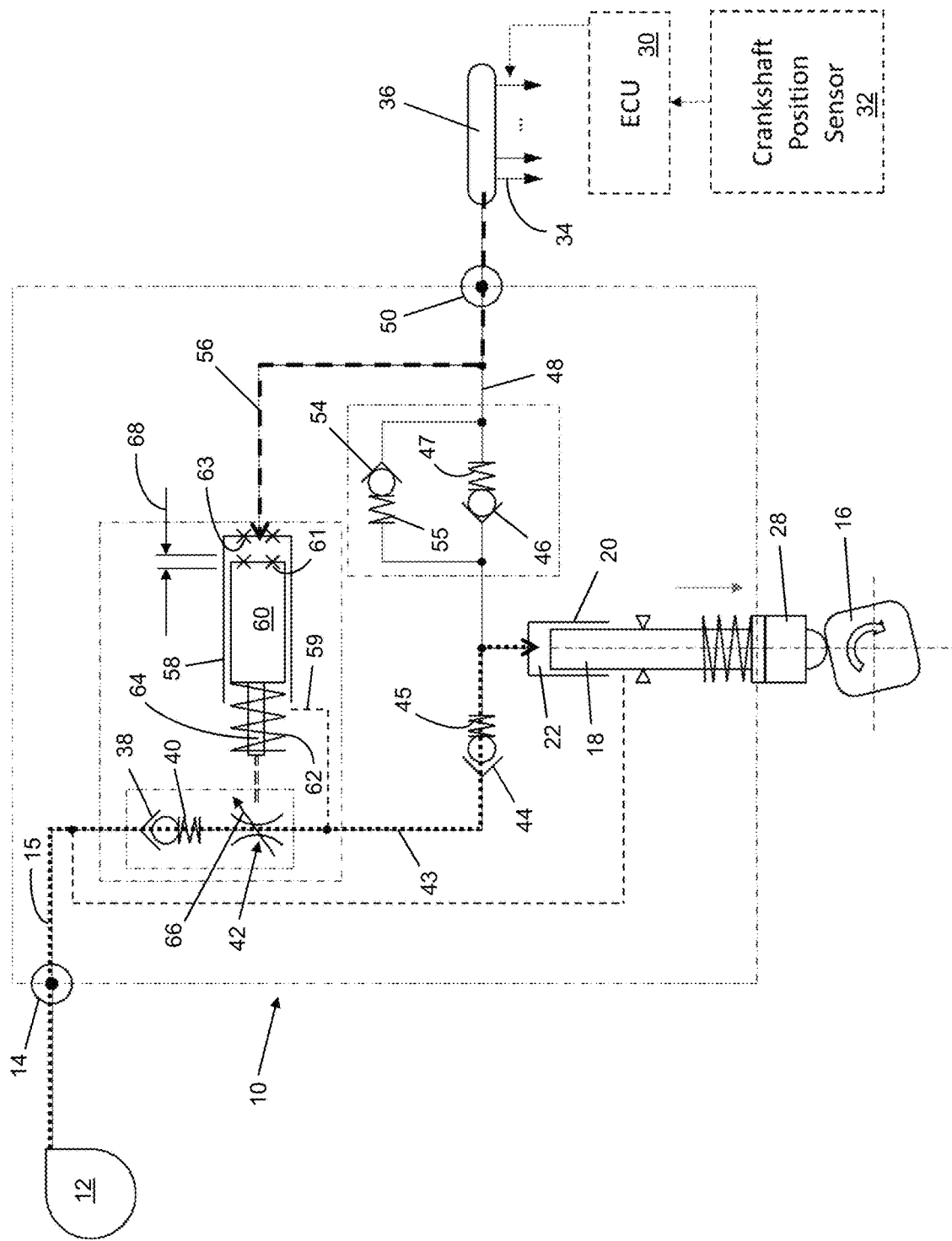

FIG. 5 illustrates operation of the disclosed HPP 10 when the pressure of the common rail 36 is low, corresponding to a demand for pressurized fuel from the HPP 10. Common rail pressure is communicated to the actuator bore 58 by the actuator passage 56. The actuator piston 60 is biased away from the metering valve member 66 by the actuator spring 62, and the bias of the actuator spring 62 is opposed by pressure from the common rail 36. Low pressure in the common rail 36 results in relatively little movement or "stroke" 68 of the actuator piston 60 toward the metering valve member 66 against the force of the actuator spring 62. A short stroke 68 of the actuator piston 60 means that the metering valve member 66 is allowed to move away from its seat without interference from the valve stop 64. The rate of fuel flow past the metering valve member 66 increases with the distance of the metering valve member 66 from its seat, and is inversely related to movement of the actuator piston 60 and valve stop 64. Alternatively stated, low pressure in the common rail 36 results in little movement of the actuator piston 60 and valve stop 64, which permits the metering valve member 66 to move away from its seat and provide greater flow capacity for fuel to enter the pumping chamber 22 during a charging cycle.

During a pumping cycle, the instantaneous pressure of the actuator passage 56 may be greater than the pressure at the common rail 36 because the actuator passage communicates with the pump outlet passage 48. Such an increase in pressure will change the actuator piston 60 position and impact metered flow through the metering valve 42. However, this kind of pressure increase in the actuator passage 56 can only occur during a pumping cycle after fuel has opened the pump outlet check valve 46 to feed the common rail 36. As shown in FIG. 4, during a pumping cycle the pump inlet check valve 44 is held closed by high pressure in the pumping chamber 22 and no fuel is passing through the inlet metering valve 42, so inlet metering is unaffected. Further, with the inlet metering check valve 38 and pump inlet check valve 44 closed, the actuator piston 60 is prevented from moving by a hydraulic lock on both sides.

Figure 6:
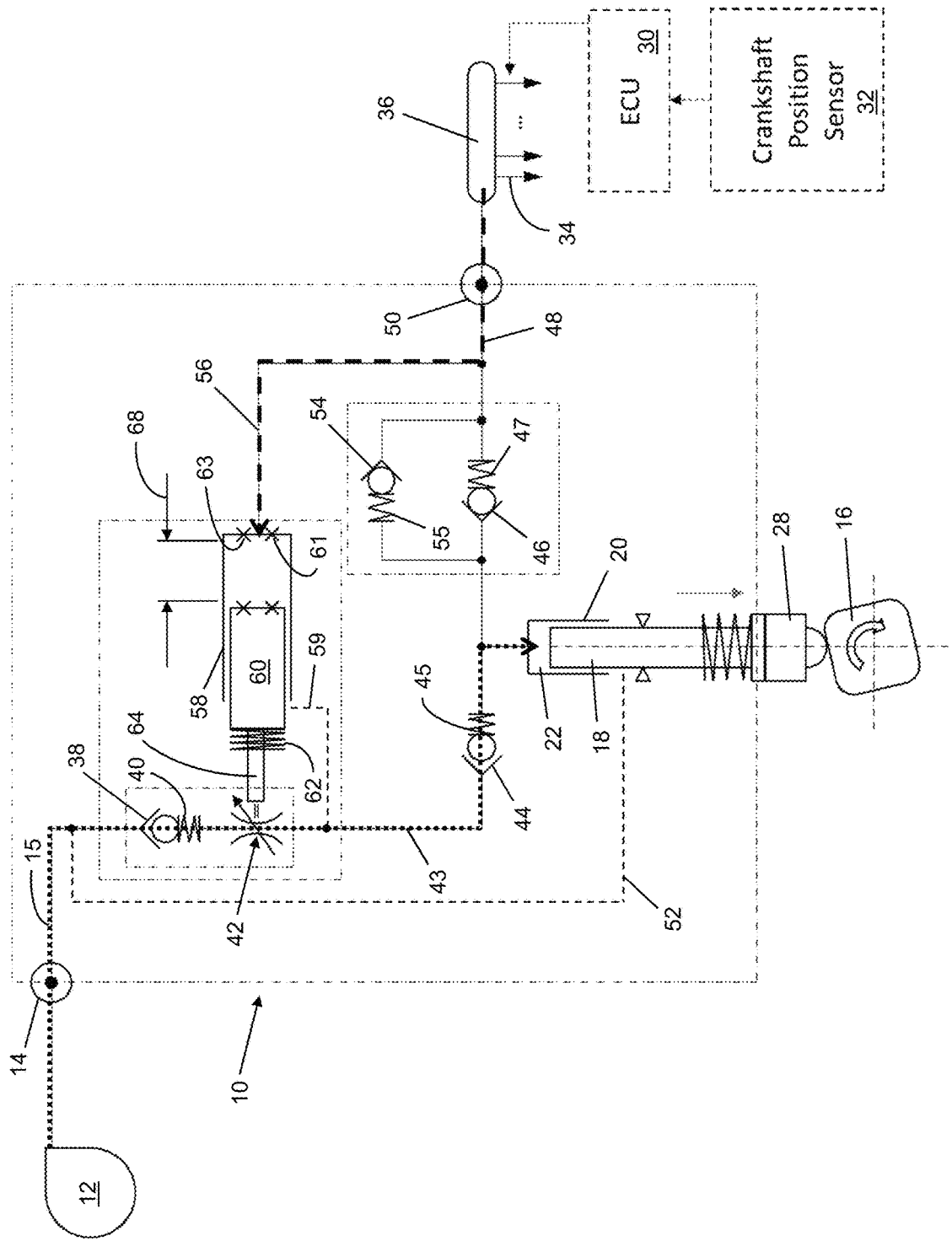

FIG. 6 illustrates operation of the disclosed HPP 10 when the pressure of the common rail 36 is high, corresponding to little or no demand for fuel from the HPP 10. High common rail pressure is communicated to the actuator bore 58 by the actuator passage 56, where the pressure moves the actuator piston 60 against the bias of the actuator spring 62. Higher pressure in the actuator bore 58 results in greater movement or "stroke" 68 of the actuator piston 60 and valve stop 64 toward the metering valve member 66. The metering valve member 66 can move away from its valve seat only so far as permitted by the valve stop 64. High pressure produces a large stroke 68 of the actuator piston 60 and valve stop 64, which restricts opening movement of the metering valve member 66, resulting in restricted flow through the inlet metering valve 42. The HPP 10 can pressurize only the quantity of fuel that enters the pumping chamber 22 during the previous charging cycle, so restricted flow through the inlet metering valve 42 results in reduced delivery of pressurized fuel to the common rail 36. In a condition where the common rail 36 is at or near the desired maximum pressure, the disclosed inlet metering valve 42 restricts additional fuel delivery. The inlet metering valve 42 may be configured so that a common rail pressure at or above the desired common rail pressure moves the actuator piston 60 and valve stop 64 into contact with the inlet metering valve member 66, preventing any fuel flow through the inlet metering valve 42.

Figure 7:
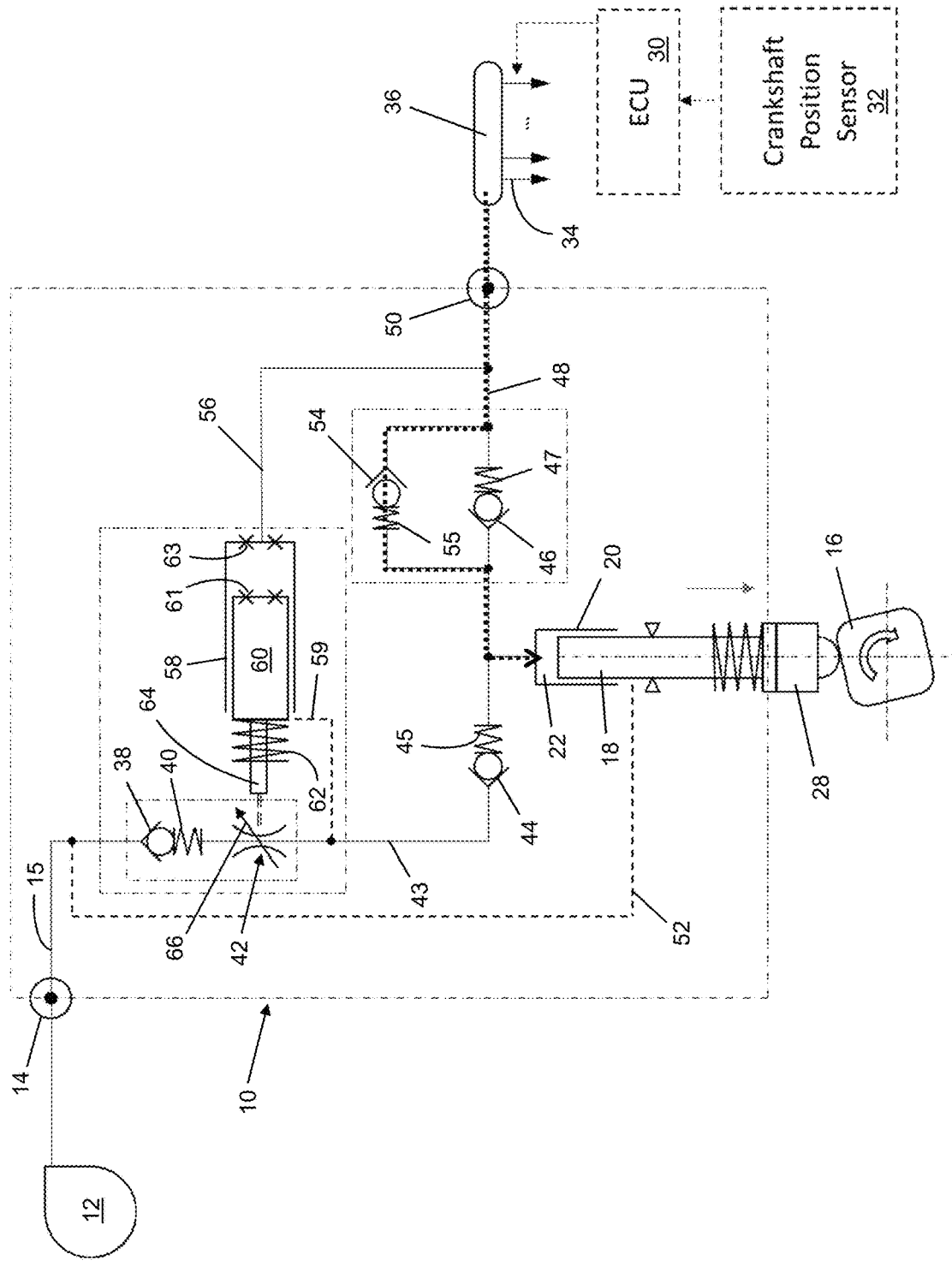

FIG. 7 illustrates operation of a pressure relief valve 54 arranged to relieve excess pressure in the common rail 36. Over-pressurization of the common rail 36 can occur due to a "heat soak" condition where the temperature of the engine and its components continue to rise after the engine is shut off due to loss of coolant circulation and/or loss of heat transfer to ambient air. Pressure in the common rail 36 will increase as the temperature of fuel in the common rail 36 increases. Excess pressure is relieved by actuation of the pressure relief valve 54. The pressure relief valve 54 in FIG. 7 is a simple one way check valve, with a ball biased by pressure relief valve spring 55. The bias of the pressure relief valve spring 55 is selected to maintain the pressure relief valve 54 closed until pressure on the ball is sufficient to move the ball against the bias of the pressure relief valve spring 55. The pressure relief valve 54 is configured to open when the pressure in the pump outlet passage 48 and common rail 36 exceeds the desired maximum pressure. When the pressure relief valve 54 is opened, excess pressure is relieved into the pumping chamber 22. The amount of fuel relieved in the heat soak scenario is small and the flow rate is low, so pressure can be relieved over an extended period of time. A relief path back to the pumping chamber 22 and past the pumping plunger 18 to the pump drain 52 is sufficient to relieve excess pressure in a heat soak situation.

A pressure excursion occurs due to a failure to keep the pressure of the common rail 36 below the desired maximum pressure while the HPP 10 is operating. This can occur with a sudden change in engine operating condition, for example from accelerating under load to coasting with little or no load when a vehicle reaches the top of a hill. In this case, the pump is pushing fuel into a common rail 36 from which no or very little fuel is being removed, resulting in excess pressure in the common rail 36. The pressure relief valve 54 must have sufficient flow area to allow all the fuel entering the common rail 36 during a pumping cycle to flow out of the common rail 36 during the next charging cycle. The pressure relief valve 54 cannot operate during a pumping cycle due to pressure exerted behind the pressure relief valve 54. The pressure relief valve 54 opens during the next charging cycle and relieves pressurized fuel back to the pumping chamber 22. The pumping plunger 18 is retracting from the pumping chamber 22, which makes room for fuel being relieved from the common rail 36. Pressure in the pumping chamber 22 keeps the pump inlet check valve 44 closed and no additional fuel volume is added while pressure is being relieved from the common rail 36 during pump operation.

Figure 8:
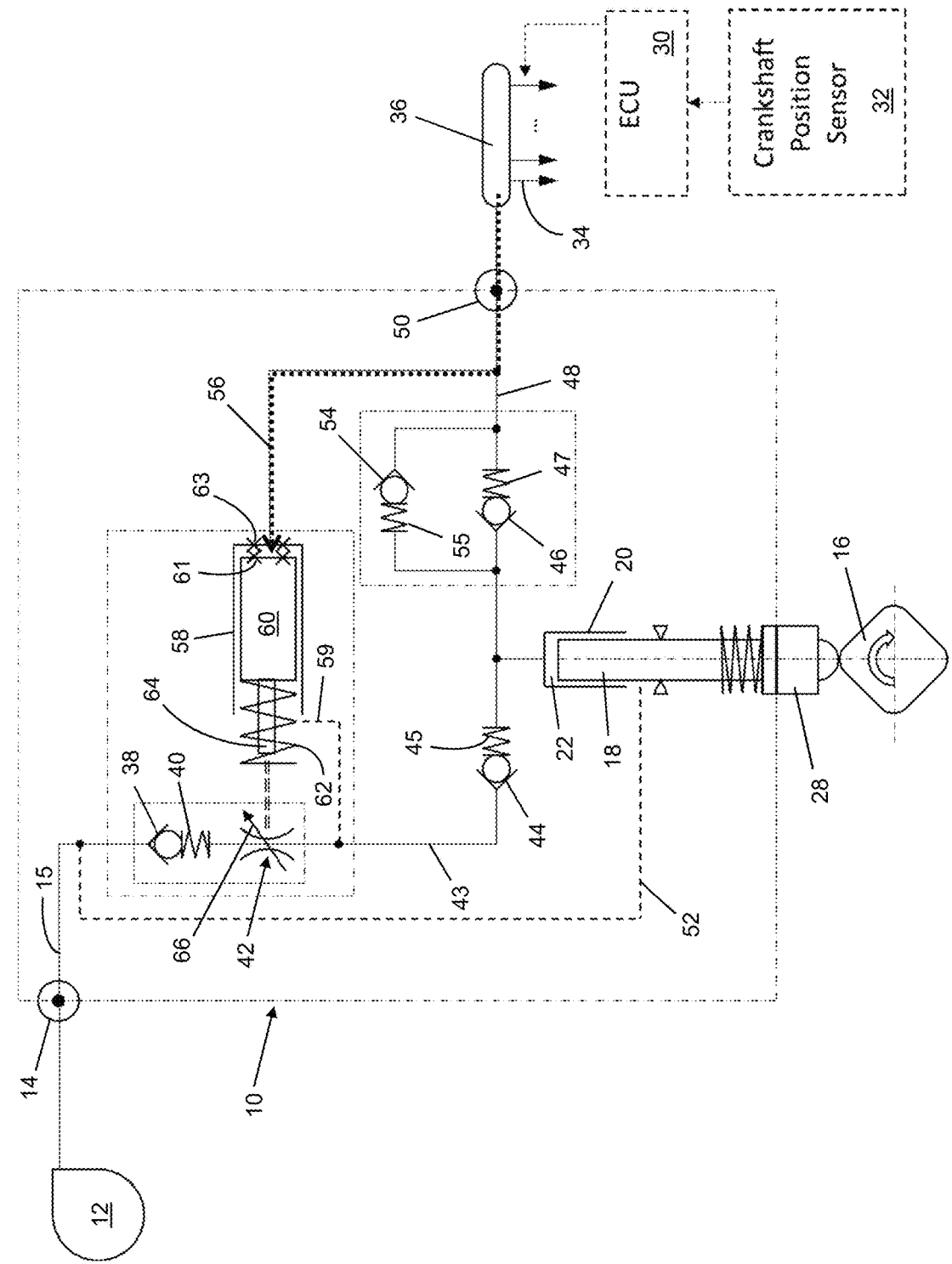

FIG. 8 illustrates how the disclosed HPP 10 maintains a minimum rail pressure even when the engine is not operating. Maintaining minimum rail pressure facilitates engine startup by providing the fuel injectors with minimum operating pressure at startup, which reduces cranking time that would otherwise be necessary to raise fuel pressure in the common rail 36. In the disclosed HPP 10, leakage past the pump outlet check valve 46 and past the actuator piston 60 will cause pressure in the common rail 36 to decay faster than desirable. In the disclosed HPP 10, leakage past the actuator piston 60 may be the primary leak path, represented by dashed line 59 in FIGS. 1-9. FIG. 8 shows the actuator piston 60 pushed against the end of the actuator bore 58 by the actuator spring 62. As described in greater detail below, a valve surface 61 on an end of the actuator piston 60 facing the end of the actuator bore 58 can be configured to mate with a valve seat 63 surrounding the entrance of the actuator passage 56 to the actuator bore 58. As pressure in the common rail 36 and actuator passage 56 decays, the actuator piston 60 is moved toward the end of the actuator bore 58 by the actuator spring 62. When pressure in the common rail 36 has decayed sufficiently, the valve surface 61 on the actuator piston 60 will contact the actuator valve seat 63 and isolate the clearance between the actuator piston 60 and actuator bore 58 from the actuator passage 56, pump outlet passage 48, outlet fitting 50 and common rail 36. A valve surface 61 on the actuator piston 60 and a valve seat 63 in the actuator bore 58 surrounding the actuator passage 56 is one example of a structure that can isolate the actuator leak path from the common rail 36, but other seal structures may also serve this function. The rail pressure retained is determined by the force of the actuator spring 62 when the actuator piston 60 is in contact with the inlet metering valve seat 63.

Figure 9:
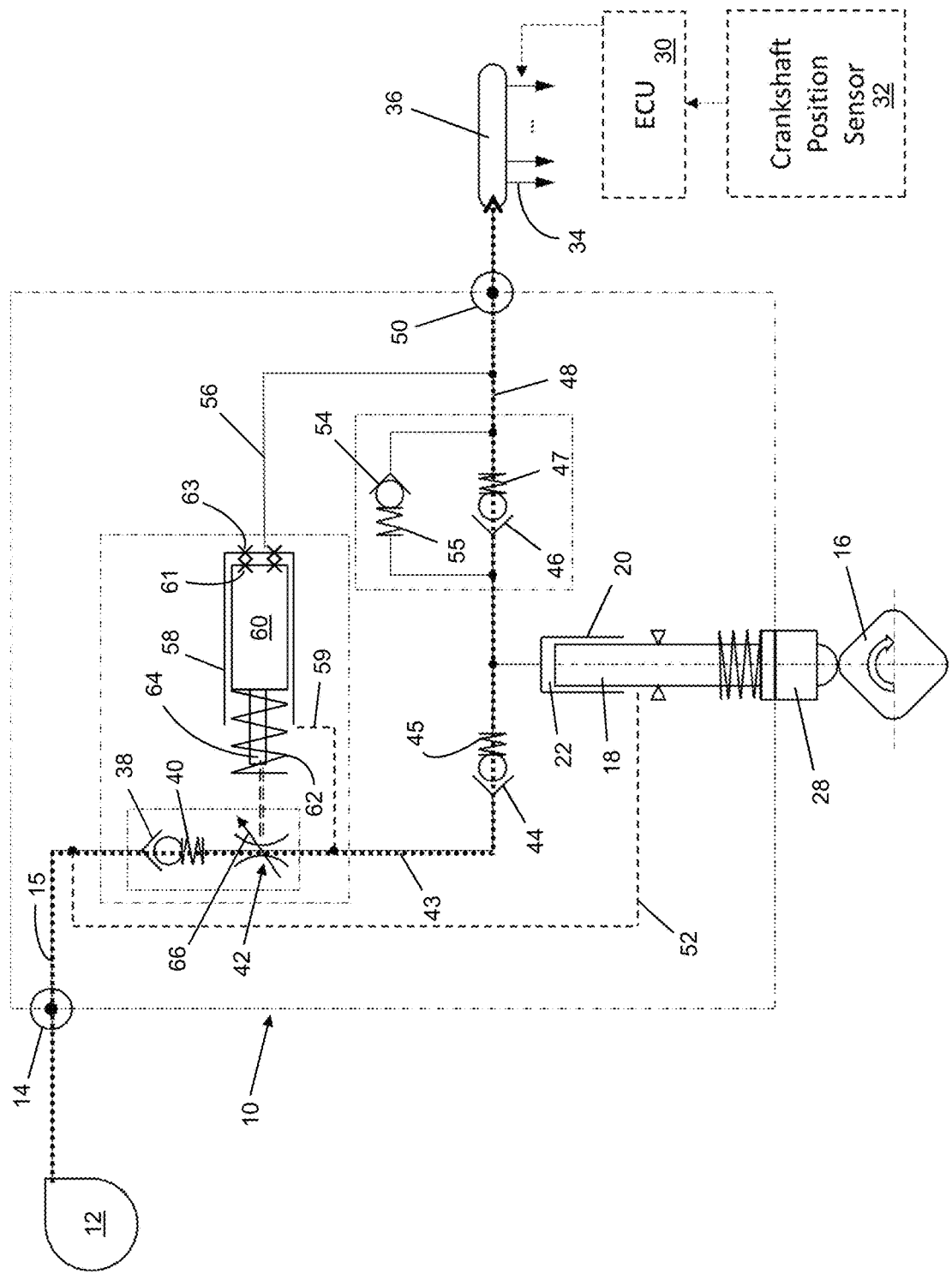

The disclosed HPP 10 is configured to pass minimum fuel pressure from the LPP 12 to the common rail 36 in situations where the HPP 10 is not operational. This allows an engine equipped with the disclosed HPP 10 to run at minimal power so a motorist can move the vehicle to safety in the event of HPP failure. As shown in FIG. 9, the inlet metering check valve spring 40, pump inlet check valve spring 45 and pump outlet check valve spring 47 are selected so that that fuel pressure of about 5 bar from the LPP 12 will open all the valves 38, 44, 46 and supply minimum pressure to the common rail 36 for use by the fuel injectors 34. The inlet metering valve 42 will be fully open, since the pressure in the actuator passage 56 and actuator bore 58 is very low. There is no opposition to opening of the pump outlet check valve 46 because pressure in the common rail 36 and pump outlet passage 48 is minimal.

Figure 10:
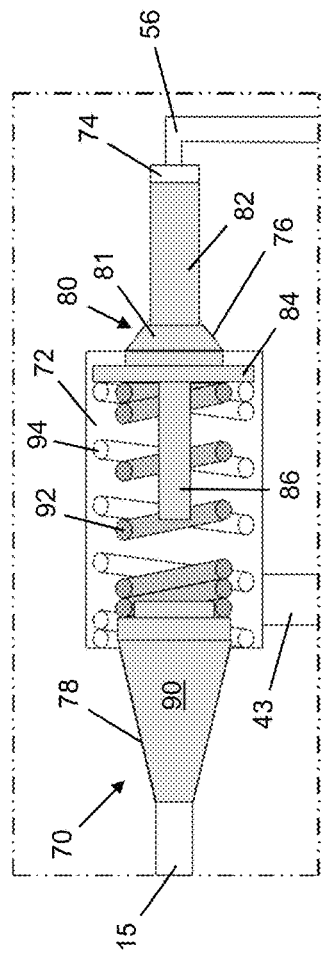
FIGS. 10-14 illustrate a pressure operated inlet metering valve according to aspects of the disclosure.

FIGS. 10-14 illustrate an exemplary embodiment of an inlet metering valve 70 according to aspects of the disclosure. The disclosed inlet metering valve 70 integrates the function of the inlet check valve 38 and inlet metering valve 42 described above with reference to FIGS. 1-9. With reference to FIG. 10, the inlet metering valve 70 is situated in a chamber 72 that communicates at one end with the fuel inlet passage 15 and at the opposite end with the actuator passage 56. A metering passage 43 leads from the chamber 72 to the pump inlet check valve 44 (see FIGS. 1-9). An actuator bore 74 extends from one end of the chamber 72 and is fluidly connected to the actuator passage 56, which exposes the actuator bore 74 to the fuel pressure of the pump outlet passage 48 and the common rail 36. A transition surface between the chamber 72 and the actuator bore 74 defines an actuator valve seat 76, which may be conical. A metering valve seat 78 (which may also be conical) is defined between the fuel inlet passage 15 and the chamber 72. Those skilled in the art will recognize that the depicted configurations of valve seats and valve members are exemplary and that other valve seat/valve member configurations may be used to accomplish the functions described for the inlet metering valve and valve formed on the actuator piston.

The actuator piston 80 includes a cylindrical portion 82 that is guided in the actuator bore 74, an actuator valve 81 arranged to mate with the actuator valve seat 76, a radially projecting annular spring seat 84, and a valve stop 86 projecting toward the inlet metering valve member 90. The inlet metering valve member 90 is biased toward the metering valve seat 78 by an inlet metering check valve spring 92 seated on the spring seat 84 formed on the actuator piston 80. The bias of the inlet metering check valve spring 92 is light, permitting the inlet metering valve member 90 to open fully at inlet fuel pressure generated by the LPP, or about 5 bar. An actuator spring 94 surrounds the inlet metering check valve spring 92 and is compressed between the spring seat 84 on the actuator piston 80 and an end of the chamber 72 to bias the actuator piston 80 and actuator valve 81 toward a closed position as shown in FIG. 10. The bias of the actuator spring 94 is selected to balance force generated against the actuator piston 80 by common rail pressure in the actuator passage 56. The bias of the actuator spring 94 is typically far greater than the bias of the inlet metering check valve spring 92. The bias of the actuator spring may be at least twice the bias of the inlet metering check valve spring, or more preferably at least five times the bias of the inlet metering check valve spring, or most preferably at least ten times the bias of the inlet metering check valve spring. The force difference between the light inlet metering check valve spring 92 and the heavier actuator spring 94 mean that the inlet metering check valve spring 92 has a negligible effect on operation of the actuator piston 80. Further, compression of the inlet metering check valve spring 92 by advance of the actuator piston 80 and spring seat 84 have a small influence on the force required to open the inlet metering valve member 90.

In the disclosed arrangement, the inlet metering valve member 90 is biased by the inlet metering check valve spring 92 toward a closed position where the inlet metering valve member 90 is seated against the inlet metering valve seat 78 as shown in FIG. 10. The inlet metering valve member 90 functions as an inlet check valve (reference numeral 38 in FIGS. 1-9) and opens only when fluid pressure at the inlet passage 15 is greater than fluid pressure in the chamber 72, which typically coincides with a charging cycle of the pump. When the pressure in the metering passage 43 is greater than the inlet pressure, the inlet metering valve member 90 closes. The disclosed inlet metering valve 70 provides a one-way flow toward the pump inlet check valve 44 consistent with the function of an inlet metering check valve such as 38 described above with reference to FIGS. 1-9. FIG. 10 shows the inlet metering valve member 90 and the actuator valve 81 in a closed position. The inlet metering valve member 90 and inlet metering valve seat 78 are configured to define a fluid flow area that varies according to displacement of the inlet metering valve member 90 relative to the inlet metering valve seat 78. Greater displacement of the inlet metering valve member 90 defines a larger flow area and permits an increased rate of flow through the inlet metering valve 70, while a smaller displacement of the inlet metering valve member 90 defines a reduced flow area and permits a reduced rate of flow through the inlet metering valve 70.

Figure 11:
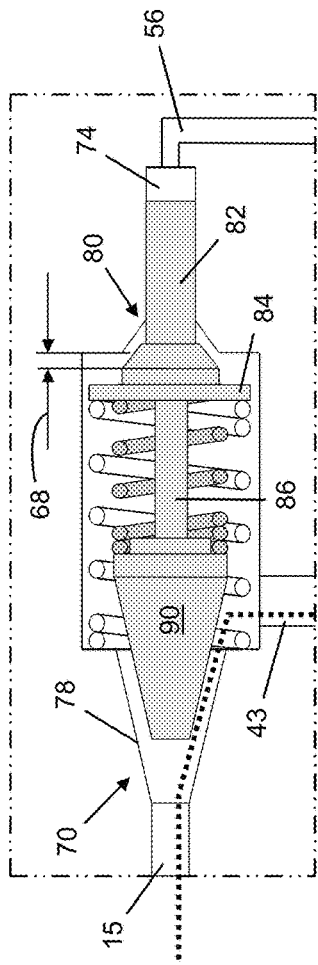

FIG. 11 illustrates the position of the inlet metering valve member 90 and actuator piston 80 in a position corresponding to metering of fuel at low common rail pressure described above with reference to FIG. 5. Low common rail pressure communicated to the actuator bore 74 by the actuator passage 56 moves the actuator piston 80 a small distance 68 toward the inlet metering valve member 90, which opens until it contacts the valve stop 86. The actuator piston 80 moves toward the inlet metering valve member 90 until a force balance is reached with the bias of the actuator spring 94. The position of the actuator piston 80 and the valve stop 86 is proportional to the pressure of the common rail communicated to the metering valve 70 by the actuator passage 56. Low pressure in the common rail results in small displacement 68 of the actuator piston 80 and valve stop 86, which allows the inlet metering valve member 90 to open further, increasing the flow rate through the inlet metering valve 70. Low common rail pressure corresponding to a demand for high pressure fuel results in increased rate of fuel flow through the inlet metering valve 70 during a charging cycle of the pump. The volume of fuel passed through the inlet metering valve 70 is pumped to the common rail 36 to satisfy demand for high pressure fuel.

Figure 12:
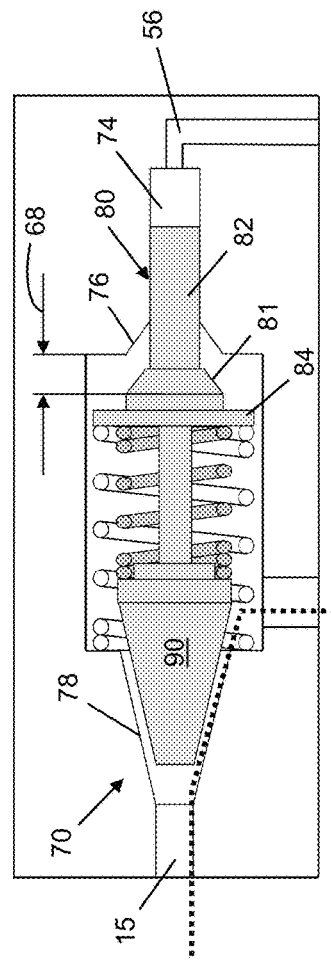

FIG. 12 illustrates the position of the inlet metering valve member 90 and actuator piston 80 corresponding to metering of fuel at high common rail pressure described above with reference to FIG. 6. Greater pressure in the actuator bore 74 counters the bias of the actuator spring 94 to advance the actuator piston 80 and valve stop 86 a distance 68 toward the inlet metering valve member 90. Movement of the inlet metering valve member 90 is restricted by the valve stop 86, resulting in a reduced flow rate through the inlet metering valve 70. As the pressure of the common rail increases, the metering restriction also increases, and vice versa. Therefore, the metering function of the disclosed inlet metering valve 70 is inversely proportional to the pressure of the common rail.

Figure 13:
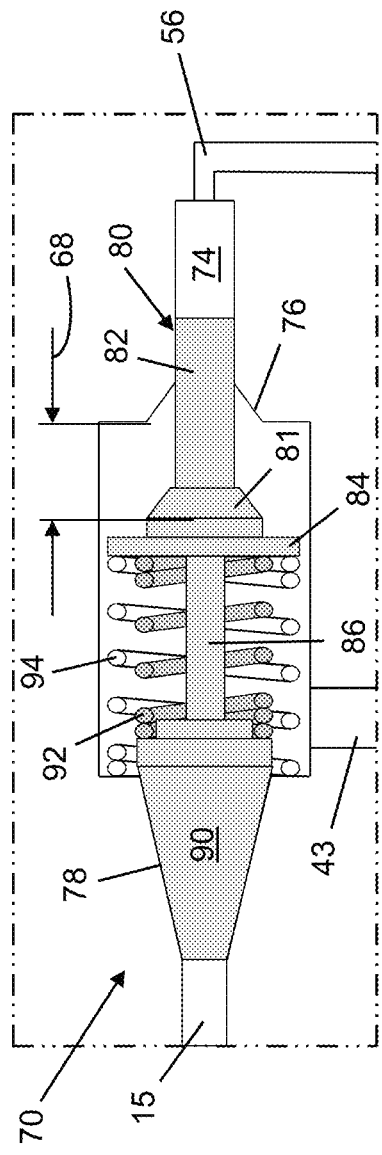

FIG. 13 illustrates the position of the inlet metering valve member 90 and actuator piston 80 when the common rail is at or above maximum pressure, which is communicated to the actuator bore 74 via the actuator passage 56. The actuator piston displacement 68 (which may also be referred to as the actuator piston stroke) is at its maximum, keeping the valve stop 86 in contact with the inlet metering valve member 90 and the inlet metering valve member 90 in contact with the inlet metering valve seat 78. The inlet metering valve member 90 is not permitted to open, resulting in no fuel flow through the inlet metering valve 70 and no fuel pumped to the common rail.

Figure 14:
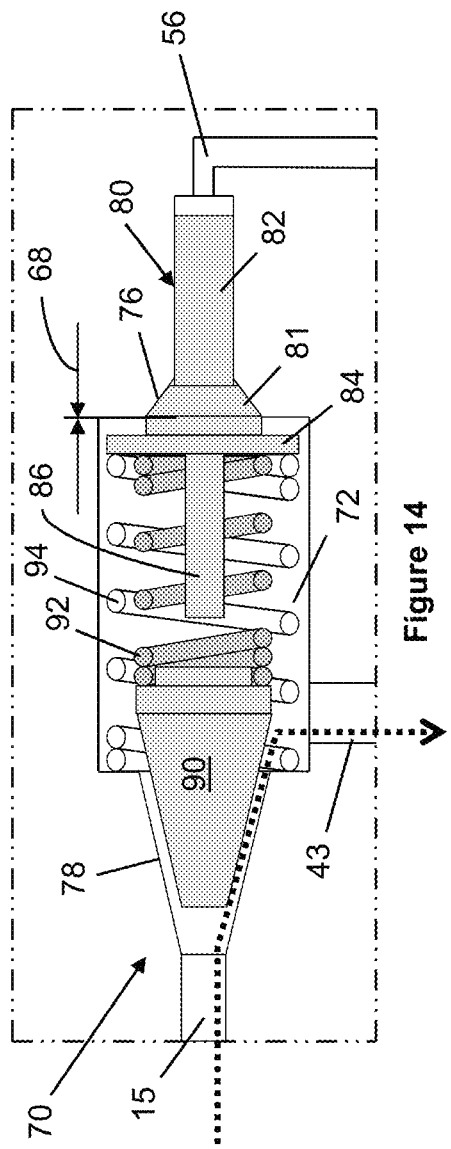

FIG. 14 illustrates the position of the inlet metering valve member 90 and actuator piston 80 in a situation where the HPP has failed as described above with reference to FIG. 9. In this so called "limp home" scenario, there is no pressure being generated downstream of the inlet metering valve 70, so there is no pressure in the actuator passage 56 and the actuator piston 80 and valve stop 86 are in a retracted position. The inlet metering check valve spring 92 force is selected to permit the inlet metering valve member 90 to open at the inlet fuel pressure provided by the LPP. After passing through the inlet metering valve 70, fuel passes through the metering passage 43, pump inlet check valve 44, pumping chamber 22, pump outlet check valve 46 and provides sufficient pressure at the common rail 36 to permit the engine to operate at reduced power. Engine operation will be sub-optimal, but sufficient to provide minimum driving capabilities towards a safe environment or maintenance facility.

The disclosed inlet metering valve 70 is configured to preserve a minimum pressure in the common rail 36 when the engine is not operational, as described above with reference to FIG. 8. After engine shut down, pressure in the common rail 36 will decay due to leakage through the pump outlet check valve 46 and the clearance between the actuator piston 80 and actuator bore 74, with leakage between the actuator piston 80 and actuator bore 74 being the primary leak path. It will be noted that the chamber 72 provides a leak path (dashed line 59 in FIGS. 1-9) for leaked fuel that communicates with the metering passage 43 toward the pump inlet check valve 44. As pressure in the common rail 36 and actuator passage 56 falls, the actuator piston 80 will move toward its retracted position under the force of the actuator spring 94. When the pressure in the actuator bore 74 falls below a force balance with the actuator spring 94, the actuator piston 80 is fully retracted and the actuator valve 81 is closed against the actuator valve seat 76 preventing further leakage. The sealing area of the actuator valve 81/actuator valve seat 76 and the force of the actuator spring 94 when the actuator piston 80 is fully retracted (actuator valve 81 in contact with the actuator valve seat 76) will determine the pressure retained in the common rail 36.

FIGS. 15-19 illustrate an integrated pump inlet check valve (ref. #44 in FIGS. 1-9), pump outlet check valve (ref. #46 in FIGS. 1-9) and pressure relief valve (ref. #54 in FIGS. 1-9) according to aspects of the disclosure. Integrating the structure of these three components reduces the space they occupy and also reduces the trapped volume of the disclosed HPP 10. The integrated valves are arranged in a stepped bore 100 in communication with the metering passage 43, pumping chamber 22 and the high pressure pump outlet passage 48 leading to the pump outlet fitting 50 and common rail 36. The pump inlet check valve is formed by an inlet check valve ball 102 biased toward a closed position against a pump inlet check valve seat 103 by a pump inlet check valve spring 104. The pump inlet check valve spring 104 is seated in a bore formed in a pressure relief valve shuttle 106 (hereafter "PRV shuttle"). The PRV shuttle 106 defines a pump outlet check valve seat 108 for the pump outlet check valve, in the form of a pump outlet check valve ball 110 biased toward a closed position by a pump outlet check valve spring 112. The pump outlet check valve spring 112 is seated in a bore defined by a pressure relief valve seat 114 (hereafter "PRV seat"). The PRV seat 114 is in a fixed position defined by the stepped bore 100, and the PRV shuttle 106 is biased against the PRV seat 114 by a pressure relief valve spring 116. According to aspects of the disclosure, an annular area 107 of the PRV shuttle 106 (surrounding the pump outlet check valve seat 108) mates with a complementary annular surface 111 of the PRV seat 114 (surrounding the pump outlet check valve ball 110). The mated annular surfaces 107/111 of the PRV shuttle 106 and the PRV seat 114 form a pressure relief valve (hereafter "PRV") as described in greater detail below.

According to aspects of the disclosure, the pressure relief valve spring 116 (hereafter "PRV spring") is in the form of a stack of conical disc springs. The PRV must remain closed against very high pressures of up to 350 bar in the common rail, and therefore the PRV spring 116 must generate high spring forces. Conical disc springs can achieve the necessary high closure forces while occupying a small volume, most of which is taken up by the conical disc springs themselves. The conical disc springs in the disclosed integrated valve reduce trapped volume in the disclosed HPP by generating high forces in a compact space and filling most of the space needed to function.

FIG. 16 illustrates the position of the components of the integrated pump inlet check valve, pump outlet check valve and pressure relief valve during a charging cycle of the pump as discussed above with reference to FIGS. 2, 5, 6, 11 and 12. The pump inlet check valve ball 102 is moved from its seat 103, permitting fuel to flow from the metering passage 43 into the pumping chamber 22. The pump outlet check valve ball 110 and PRV 107/111 remain closed. FIG. 17 illustrates operation of the integrated valves during a pumping cycle as discussed above with reference to FIG. 4. At the end of the charging cycle, fuel flow through the pump inlet check valve stops and the pump inlet check valve ball 102 closes under the bias of the pump inlet check valve spring 104. The pumping plunger advances into the pumping chamber 22, generating pressure that holds the pump inlet check valve ball 102 closed and opens the pump outlet check valve ball 110, pumping fuel into the pump outlet passage 48 and common rail 36.

FIG. 18 illustrates operation of the PRV 107/111 to relieve pressure in the common rail when the HPP is operating as discussed above with reference to FIG. 7. The PRV components are selected so that the PRV spring 116 compresses when the outlet check valve ball 110 and PRV shuttle 106 are exposed to pressure equal to or greater than the maximum pressure in the pump outlet passage 48 to open a pressure relief path back to the pumping chamber 22. The PRV seat 114 defines an outlet opening in communication with the pump outlet 48 leading to the common rail 36. The outlet check valve ball 110 and PRV shuttle 106 are exposed to the pressure of the common rail 36 via the pump outlet passage 48. During a pumping cycle, high fluid pressure is present at both sides of the PRV shuttle 106, resulting in a pressure balance across the PRV shuttle 106/PRV seat 114, so the PRV is inactive. At the end of a pumping cycle, the pressure in the pumping chamber 22 drops, and the pump outlet check valve ball 110 closes under the bias of the pump outlet check valve spring 112 and is held closed by pressure in the pump outlet passage 48 and common rail 36. The pumping plunger 18 is retracting from the pumping bore, reducing pressure in the pumping chamber 22. In this condition, the closed outlet check valve ball 110 cannot open and the closed pump outlet check valve ball 110 and PRV shuttle 106 are exposed to the pressure of the common rail. When the pressure of the common rail is greater than the desired maximum rail pressure, the PRV shuttle 106 and closed pump outlet check valve ball 110 generate sufficient force to compress the PRV spring 116 and separate the PRV shuttle 106 from the PRV seat 114 to open a pressure relief path back to the pumping chamber 22. Because the pressure of the pumping chamber 22 is low and the pump plunger 18 is retracting, the pressure relief path through the PRV 107/111 can quickly relieve all the fuel entering the common rail 36 during a previous pumping cycle.

The disclosed PRV 107/111 functions in a similar manner to relieve excess common rail pressure in a heat soak scenario, with the amount of fluid being relieved being smaller and the rate of flow being slow as compared to pressure relief when the HPP is operational. The disclosed PRV will open to the extent necessary to allow pressure relief into the pumping chamber and past the clearance between the pumping plunger 18 and the pump bore 20, to the pump drain 52 as described above with reference to FIG. 7.

Figure 19:
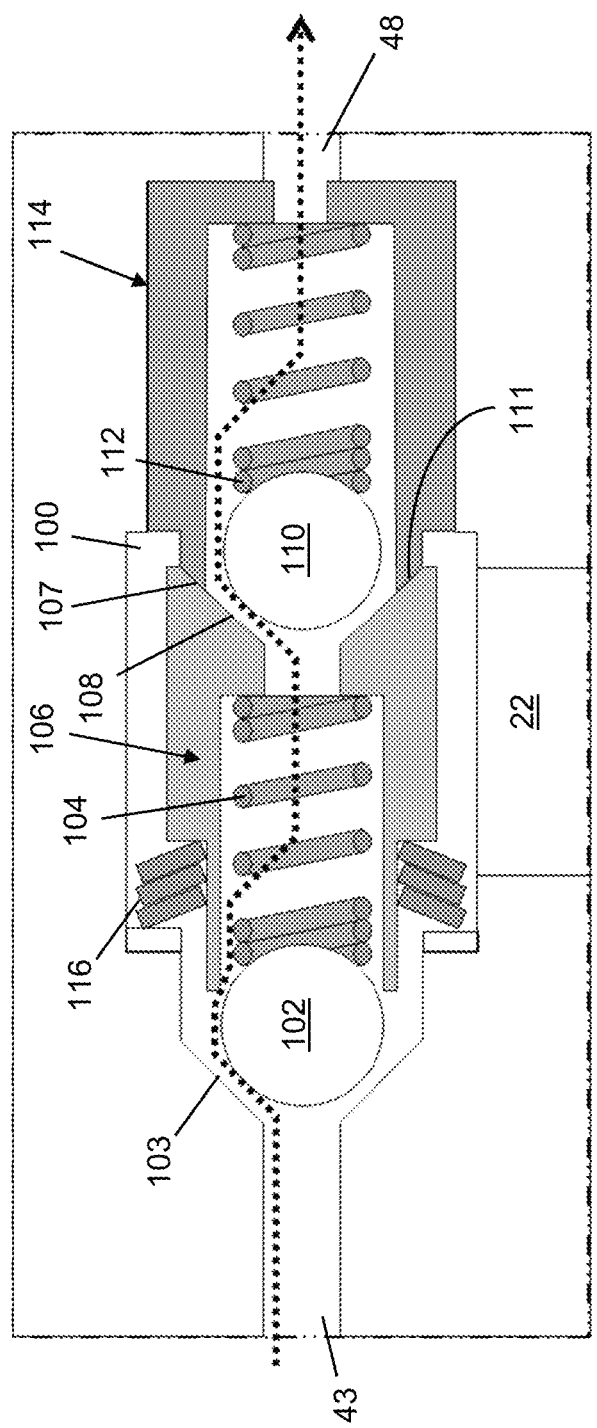

FIG. 19 illustrates the position of valve elements in a "limp home" scenario where the HPP is not operating as discussed above with reference to FIGS. 9 and 14. Failure of the HPP will cause pressure in the common rail to fall quickly, resulting in the absence of pressure behind the pump inlet check valve ball 102 and the pump outlet check valve ball 110. The pump inlet check valve spring 104 and pump outlet check valve spring 112 are selected to permit the pump inlet check valve ball 102 and the pump outlet check valve ball 110 to open at feed pressure from the LPP 12, when there is no back pressure to hold them closed. Fuel is permitted to flow past the pump inlet check valve ball 102, past the pumping chamber 22 and past the pump outlet check valve ball 110, providing minimum pressure to the common rail.

FIGS. 20-24 illustrate a pump outlet check valve and PRV integrated into a pump outlet fitting 120. The pump outlet fitting 120 defines a stepped bore 122 communicating at one end with the pumping chamber 22 (or a passage fluidly connected to the pumping chamber) and at the other end with the high pressure passage 48 to the common rail. The pump outlet check valve and PRV of FIGS. 20-24 are similar in structure and function to the outlet check valve and PRV described above with reference to FIGS. 15-19. A PRV seat 124 defines an outlet flow path surrounding an outlet check valve spring seat 126 arranged on an axis of the pump outlet fitting 120. The pump outlet check valve ball 128 is biased by the pump outlet check valve spring 130 toward a pump outlet check valve seat 132 on the PRV shuttle 134. The PRV seat 124 includes an annular, conical surface 136 that mates with a complementary surface 138 (surrounding the pump outlet check valve 128/132) on the PRV shuttle 134 to form a pressure relief valve (hereafter "PRV"). The PRV seat 124 is held in a fixed position defined by the stepped bore 122, and the PRV shuttle 134 is biased against the PRV seat 124 by a PRV spring 126. According to aspects of the disclosure, the PRV spring 126 is a stack of conical disc springs compressed between a pressure relief valve cup 140 (hereafter "PRV cup") and the PRV shuttle 134 to bias the PRV shuttle 134 toward a closed position illustrated in FIG. 20. The PRV cup 140 has an interference fit within the stepped bore 122 of the pump outlet fitting 120, and traps the PRV shuttle 134, PRV spring 126, pump outlet check valve ball 128, pump outlet check valve spring 130 and PRV seat 124 within the pump outlet fitting 120. The position of the PRV cup in the stepped bore is set during assembly to calibrate the opening pressure of the PRV. The opening pressure of the PRV can be calibrated before assembly to the pump.

The outlet fitting 120 including an integrated PRV and pump outlet check valve minimize the trapped volume of the HPP to which the outlet fitting 120 is attached, provide high flow capacity through the PRV, and the short stroke of the PRV shuttle 134 results in fast actuation and closure of the PRV while the HPP is operating. As previously discussed, the pump outlet check valve ball 128 opens only when the pressure in the high pressure passage 48 leading to the common rail is less than the pressure in the pumping chamber 22 or passage leading from the pumping chamber 22 to the pump outlet fitting 120 as shown in FIG. 21. This condition occurs during a pumping cycle when the pressure of the high pressure outlet passage 48 and common rail 36 are below maximum pressure. FIG. 22 illustrates actuation of the PRV in response to a heat soak condition where the pressure of the common rail is greater than maximum pressure. The PRV shuttle 134 and closed pump outlet check valve ball 128 are exposed to the pressure of the common rail through the high pressure passage 48 connected to the pump outlet fitting 120. The PRV shuttle 134 is moved away from the PRV seat 124 against the bias of the PRV spring 126 and allows excess pressure to pass through the PRV into the pumping chamber 22, where the pressure can bleed off slowly through the clearance between the pumping plunger 18 and pump bore 20 to the pump drain 52 as described above with reference to FIGS. 1-9. In a heat soak condition, the PRV shuttle 134 will move (open) a small amount because the volume of fluid being relieved is small and the rate of fluid flow is low. FIG. 23 illustrates actuation of the PRV during pump operation, which is exactly the same as PRV actuation in response to a heat soak, except the PRV shuttle 134 will open further due to the larger volume of fluid to be relieved and the high rate of fluid flow required to relieve pressure during a charging cycle of the pump.

FIG. 24 illustrates operation of the pump outlet check valve ball 128 during a "limp home" scenario where the HPP is not operational. In this scenario, the high pressure passage 48 and common rail are no longer being supplied with high pressure fuel. The pump outlet check valve spring 130 is selected with a light bias that will open when exposed to feed pressure generated by the LPP that has passed the inlet metering valve 70 and pump inlet check valve and through the pumping chamber 22. With no pressure behind it, the pump outlet check valve ball 128 opens when exposed to feed pressure and allows low pressure fuel to fill the common rail. Common rail pressure corresponding to feed pressure from the LPP is sufficient to allow the fuel injectors and engine to operate at reduced power. Engine operation will be sub-optimal, but sufficient to provide minimum driving capabilities towards a safe environment or maintenance facility.

What is claimed is:

1. A high pressure fuel pump in which a pumping plunger is driven by a cam follower in contact with a profile of a rotating cam, the pumping plunger reciprocating axially in a pumping chamber between a retracting motion during which fuel is delivered to the pumping chamber and a pumping motion during which the plunger pressurizes fuel in the pumping chamber, said pressurized fuel flowing through a pump outlet passage to a pressurized common rail, said fuel pump comprising:

an inlet metering valve arranged to control a quantity of fuel delivered to the pumping chamber during retracting motion of the pumping plunger, said inlet metering valve including:
a metering valve member arranged to control fuel flow between a pump inlet and a metering passage leading into said pumping chamber, said metering valve member movable between a closed position preventing fuel flow into the pumping chamber and an open position allowing fuel to fill the pumping chamber, movement of said metering valve member from said closed position to said open position defining a variable flow area that increases as said metering valve member moves from said closed position toward said open position, said metering valve member biased toward said closed position by an inlet metering check valve spring compressed between said metering valve member and said actuator piston;
an actuator piston in an actuator bore exposed to pressure in said common rail, said actuator piston biased toward a first position corresponding to low pressure in said common rail and movable toward a second position corresponding to maximum pressure in said common rail, said actuator piston including a valve stop that determines a metering position of said metering valve member, said actuator piston biased toward said first position by an actuator spring compressed between an interior shoulder of said actuator bore and said actuator piston;
wherein said metering valve member opens during retracting motion of said pumping plunger against the bias of said inlet metering check valve spring to a metering position in contact with said valve stop, said metering position defining a variable flow area which is a function of the pressure in the common rail communicated to the actuator bore, said metering valve member moving away from said closed position only when fuel pressure in said pump inlet is greater than fuel pressure in said metering passage, thereby acting as a pump inlet check valve.

2. The high pressure fuel pump of claim 1, wherein said actuator spring is selected so that said actuator piston moves to said second position when said common rail is equal to or greater than said maximum pressure and a force balance between pressure in said common rail and said actuator spring determines a position of said actuator piston between said first and second positions.

3. The high pressure fuel pump of claim 1, wherein said actuator piston includes an actuator valve, and said actuator bore includes an actuator valve seat, said actuator valve seated against said actuator valve seat when said actuator piston is in said first position to prevent fuel flow from said common rail past said actuator piston.

4. The high pressure fuel pump of claim 1, wherein said pump includes a pump body defining said pumping chamber, said pump outlet passage and an actuator passage connecting said pump outlet passage to said actuator bore.

5. A method of controlling the quantity of fuel delivered to a pumping chamber of a high pressure fuel pump in which a pumping plunger is driven by a cam follower in contact with a profile of a rotating cam, the pumping plunger reciprocating axially in the pumping chamber between a retracting motion during which fuel is delivered to the pumping chamber and a pumping motion during which the plunger pressurizes fuel in the pumping chamber, said pressurized fuel flowing through a pump outlet passage to a pressurized common rail, said method comprising:
 arranging an inlet metering valve to control a quantity of fuel delivered to the pumping chamber during retracting motion of the pumping plunger, said inlet metering valve including:
  defining a variable flow area between a pump inlet and a metering passage connected to said pumping chamber by moving a metering valve member between a closed position preventing fuel flow into the pumping chamber and an open position allowing fuel to fill the pumping chamber, movement of said metering valve member from said closed position to said open position defining said variable flow area, said variable flow area increasing as said metering valve member moves from said closed position toward said open position;
  controlling a metering position of said metering valve member by positioning an actuator piston in an actuator bore exposed to pressure in said common rail, said actuator piston biased toward a first position corresponding to low pressure in said common rail and movable toward a second position corresponding to maximum pressure in said common rail, said actuator piston including a valve stop that determines a metering position of said metering valve member, said inlet metering valve member moving independently of said actuator piston between said closed position and said metering position; and
 defining a variable flow area between said pump inlet and said metering passage by opening said metering valve member to a metering position in contact with said valve stop during retracting motion of said pumping plunger, said variable flow area being a function of the pressure in the common rail communicated to the actuator bore.

6. The method of claim 5, comprising:
biasing said metering valve member toward said closed position with an inlet metering check valve spring compressed between said metering valve member and said actuator piston.

7. The method of claim 5, comprising:
providing a pump body defining said pumping chamber and said pump outlet passage extending from said pumping chamber;
defining an actuator bore within said pump body and defining an actuator passage extending between said pump outlet passage and said actuator bore, said actuator passage applying fuel pressure in said pump outlet passage to a first end of said actuator piston, said pump outlet fuel pressure opposing the bias applied to said actuator piston to move said actuator piston away from said first position to a position that is a function of pressure in said pump outlet passage during retracting motion of the pumping plunger.

8. The method of claim 5, comprising:
biasing said metering valve member toward said closed position with an inlet metering check valve spring compressed between said metering valve member and said actuator piston;
biasing said actuator piston toward said first with an actuator spring compressed between an inside surface of said actuator bore and said actuator piston; and
selecting said actuator spring to generate an actuator piston bias force, and selecting said inlet metering check valve spring to generate an inlet metering check valve bias force, said actuator spring bias force greater than said inlet metering check valve bias force,
wherein said metering valve member opens when fuel pressure in said pump inlet is greater than fuel pressure in said metering passage and movement of said actuator piston is substantially unaffected by the bias force of the inlet metering check valve spring.

9. The method of claim 7, comprising:
defining an actuator valve seat in said actuator bore between said actuator passage and said actuator piston; and
providing an actuator valve on said actuator piston,
wherein said actuator valve seats against said actuator valve seat to prevent fuel flow past said actuator piston when said actuator piston is in said first position.

10. The method of claim 9, comprising:
selecting said actuator spring to have a bias moving said actuator valve into contact with said actuator valve seat when fuel pressure in said actuator passage falls to a minimum fuel pressure.

11. The method of claim 5, comprising:
biasing said metering valve member toward said closed position with an inlet metering check valve spring selected so that said inlet metering valve member opens when fuel pressure in said pump inlet is greater than fuel pressure in said metering passage, allowing said metering valve member to function as a pump inlet check valve.

12. The method of claim 5, comprising:
providing a pump body defining said pumping chamber and said pump outlet passage extending from said pumping chamber;
defining an actuator bore within said pump body, said actuator bore in fluid communication with said metering passage;
defining an actuator passage extending between said pump outlet passage and said actuator bore, said actuator passage applying fuel pressure in said pump outlet passage to a first end of said actuator piston,
wherein leakage of fuel past said actuator piston flows into said metering passage.

13. The method of claim 5, comprising:
defining an actuator bore in which said actuator piston moves in response to fuel pressure in said actuator passage; and providing a pump inlet check valve between said metering passage and said pumping chamber, said pump inlet check valve closing when fuel pressure in said pumping chamber is greater than fuel pressure in said metering passage, closure of said inlet check valve stopping fuel flow into said pumping chamber.

\* \* \* \* \*